(12) United States Patent
Watanabe et al.

(10) Patent No.: US 11,888,368 B2
(45) Date of Patent: Jan. 30, 2024

(54) ROTOR, ELECTRIC MOTOR, AIR BLOWER, AIR CONDITIONER, AND METHOD FOR FABRICATING ROTOR

(71) Applicant: Mitsubishi Electric Corporation, Tokyo (JP)

(72) Inventors: Takanori Watanabe, Tokyo (JP); Hiroki Aso, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 329 days.

(21) Appl. No.: 17/413,353

(22) PCT Filed: Dec. 17, 2018

(86) PCT No.: PCT/JP2018/046344
§ 371 (c)(1),
(2) Date: Jun. 11, 2021

(87) PCT Pub. No.: WO2020/129123
PCT Pub. Date: Jun. 25, 2020

(65) Prior Publication Data
US 2022/0045589 A1 Feb. 10, 2022

(51) Int. Cl.
*H02K 21/16* (2006.01)
*H01F 41/02* (2006.01)
(Continued)

(52) U.S. Cl.
CPC ........... *H02K 21/16* (2013.01); *H01F 41/028* (2013.01); *H02K 1/278* (2013.01); *H02K 1/2733* (2013.01);
(Continued)

(58) Field of Classification Search
CPC ...... H02K 21/16; H02K 1/2733; H02K 1/278; H02K 1/2786; H02K 15/03;
(Continued)

(56) References Cited

U.S. PATENT DOCUMENTS

| 5,631,093 A | 5/1997 | Perry et al. |
| 2004/0108789 A1* | 6/2004 | Marshall ................... H02P 6/16 |
| | | 310/216.016 |

(Continued)

FOREIGN PATENT DOCUMENTS

| CN | 203166649 U | 8/2013 |
| JP | S59-292759 A | 5/1984 |

(Continued)

OTHER PUBLICATIONS

Translation of JP-2000197288-A accessed from https://worldwide.espacenet.com/patent/search/family/018500703/publication/JP2000197288A?q=JP%202000197288%20A. ( year: 2023.).*

(Continued)

*Primary Examiner* — Christopher M Koehler
*Assistant Examiner* — Riley Owen Stout
(74) *Attorney, Agent, or Firm* — POSZ LAW GROUP, PLC

(57) ABSTRACT

A rotor includes at least one first permanent magnet and at least one second permanent magnet. The at least one first permanent magnet forms part of an outer peripheral surface of the rotor and is magnetized to have polar anisotropy. The at least one second permanent magnet is adjacent to the at least one first permanent magnet in a circumferential direction of the rotor and has lower magnetic force than magnetic force of the at least one first permanent magnet.

18 Claims, 21 Drawing Sheets

(51) Int. Cl.
*H02K 1/2733* (2022.01)
*H02K 1/2746* (2022.01)
*H02K 1/2786* (2022.01)
*H02K 7/14* (2006.01)
*H02K 15/03* (2006.01)
*H02K 1/278* (2022.01)

(52) U.S. Cl.
CPC ......... *H02K 1/2746* (2013.01); *H02K 1/2786* (2013.01); *H02K 7/14* (2013.01); *H02K 15/03* (2013.01); *H02K 2213/03* (2013.01)

(58) Field of Classification Search
CPC ........ H02K 2213/03; H02K 1/02; H02K 7/14; H02K 2201/06; H01F 41/028; H01F 7/021; C22C 2202/02
See application file for complete search history.

(56) References Cited

U.S. PATENT DOCUMENTS

| | | | |
|---|---|---|---|
| 2006/0055266 | A1 | 3/2006 | Iwami et al. |
| 2015/0295457 | A1 | 10/2015 | Yamada et al. |
| 2016/0285330 | A1* | 9/2016 | Mukai .................. F25B 31/026 |
| 2018/0294685 | A1* | 10/2018 | Ryu .................... F04C 29/0085 |

FOREIGN PATENT DOCUMENTS

| | | | | |
|---|---|---|---|---|
| JP | H02-079738 | A | | 3/1990 |
| JP | 2000-197288 | A | | 7/2000 |
| JP | 2000197288 | A | * | 7/2000 |
| JP | 2001-025193 | A | | 1/2001 |
| JP | 2003-052140 | A | | 2/2003 |
| JP | 2005045978 | A | * | 2/2005 |
| JP | 2005045978 | A | | 2/2005 |
| JP | 2005-151757 | A | | 6/2005 |
| JP | 2007-208104 | A | | 8/2007 |
| JP | 2008-245488 | A | | 10/2008 |
| JP | 2010-252419 | A | | 11/2010 |
| JP | 2010283978 | A | | 12/2010 |
| JP | 2011-087393 | A | | 4/2011 |
| JP | 2012-228072 | A | | 11/2012 |
| JP | 2016219607 | A | | 12/2016 |
| KR | 20180113410 | A | | 10/2018 |

OTHER PUBLICATIONS

Translation of JP-2005045978-A accessed from: https://worldwide.espacenet.com/patent/search/family/034265852/publication/JP2005045978A?q=JP%202005045978%20A. ( year: 2023.).*
Office Action dated Mar. 11, 2022 in connection with counterpart Australian Patent Application No. 2018453979.
Office Action dated Sep. 30, 2022 in connection with counterpart Australian Patent Application No. 2018453979.
Office Action dated Aug. 30, 2022 in connection with counterpart Japanese Patent Application No. 2020-560654 (and English machine translation).
Office Action dated Feb. 22, 2022 in connection with corresponding IN Patent Application No. 202127021355.
Office Action dated Feb. 22, 2022 in connection with corresponding JP Patent Application No. 2020-560654 (with X machine English translation).
Extended European Search Report dated Nov. 29, 2021 in connection with counterpart European Patent Application No. 18943492.1.
International Search Report dated Feb. 26, 2019, in corresponding International Application PCT/JP2018/046344 (and English translation).

* cited by examiner

ROTOR, ELECTRIC MOTOR, AIR BLOWER, AIR CONDITIONER, AND METHOD FOR FABRICATING ROTOR

CROSS REFERENCE TO RELATED APPLICATION

This application is a U.S. national stage application of International Patent Application No. PCT/JP2018/046344 filed on Dec. 17, 2018, the disclosure of which is incorporated herein by reference.

TECHNICAL FIELD

The present invention relates to a rotor for use in an electric motor.

BACKGROUND

A rotor having two types of magnets is generally used as a rotor for use in an electric motor (see, for example, Patent Reference 1). In Patent Reference 1, permanent magnets having high magnetic force (also referred to as first permanent magnets) form the entire outer peripheral surface of the rotor, and permanent magnets having lower magnetic force than that of the first permanent magnets (also referred to as second permanent magnets) are disposed at the inner side of the first permanent magnets. In this rotor, since the first permanent magnets form the entire outer peripheral surface of the rotor, magnetic force of the rotor can be effectively enhanced.

PATENT REFERENCE

Patent Reference 1: Japanese Patent Application Publication No. 2005-151757

In the case where the first permanent magnet having high magnetic force form the entire outer peripheral surface of the rotor, however, sufficient magnetic force of the rotor can be obtained, but there is a problem in that the cost of the rotor increases because of high price of a magnet having high magnetic force.

SUMMARY

It is therefore an object of the present invention to obtain sufficient magnetic force of a rotor even with reduction of the amount of first permanent magnet having high magnetic force.

A rotor according to an aspect of the present invention is a rotor having 2n (n is a natural number) magnetic poles and including: at least one first permanent magnet forming part of an outer peripheral surface of the rotor and magnetized to have polar anisotropy; and at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and the at least one second permanent magnet is a single integral ring-shaped magnet.

A rotor according to another aspect of the present invention is a rotor having 2n (n is a natural number) magnetic poles and including a plurality of layered magnets composed of two to m (m is a natural number and a divisor for n) layers that are stacked in an axial direction, wherein each layered magnet of the plurality of layered magnets includes at least one first permanent magnet forming part of an outer peripheral surface of the rotor and magnetized to have polar anisotropy, and at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and in each first permanent magnet of the plurality of layered magnets, supposing one cycle is an angle formed by adjacent north poles in a plane orthogonal to the axial direction of the rotor, positions of north poles of two first permanent magnets adjacent to each other in the axial direction are shifted from each other by n/m cycles in the circumferential direction, and the at least one second permanent magnet is a single integral ring-shaped magnet.

According to the present invention, even when the amount of first permanent magnet having high magnetic force is reduced, sufficient magnetic force of the rotor can be obtained.

DETAILED DESCRIPTION

First Embodiment

In an xyz orthogonal coordinate system shown in each drawing, a z-axis direction (z axis) represents a direction parallel to an axis Ax of a rotor 2, an x-axis direction (x axis) represents a direction orthogonal to the z-axis direction (z axis), and a y-axis direction (y axis) represents a direction orthogonal to both the z-axis direction and the x-axis direction. The axis Ax is a rotation center of the rotor 2. The axis Ax also represents an axis of an electric motor 1 described later. A direction parallel to the axis Ax is also referred to as an "axial direction of the rotor 2" or simply as an "axial direction." The "radial direction" is a radial direction of the rotor 2 or a stator 3, and a direction orthogonal to the axis Ax. An xy plane is a plane orthogonal to the axial direction. An arrow D1 represents a circumferential direction about the axis Ax.

In some drawings, "N" and "S" respectively represent a north pole and a south pole in the rotor 2 (including variations).

Figure 1:
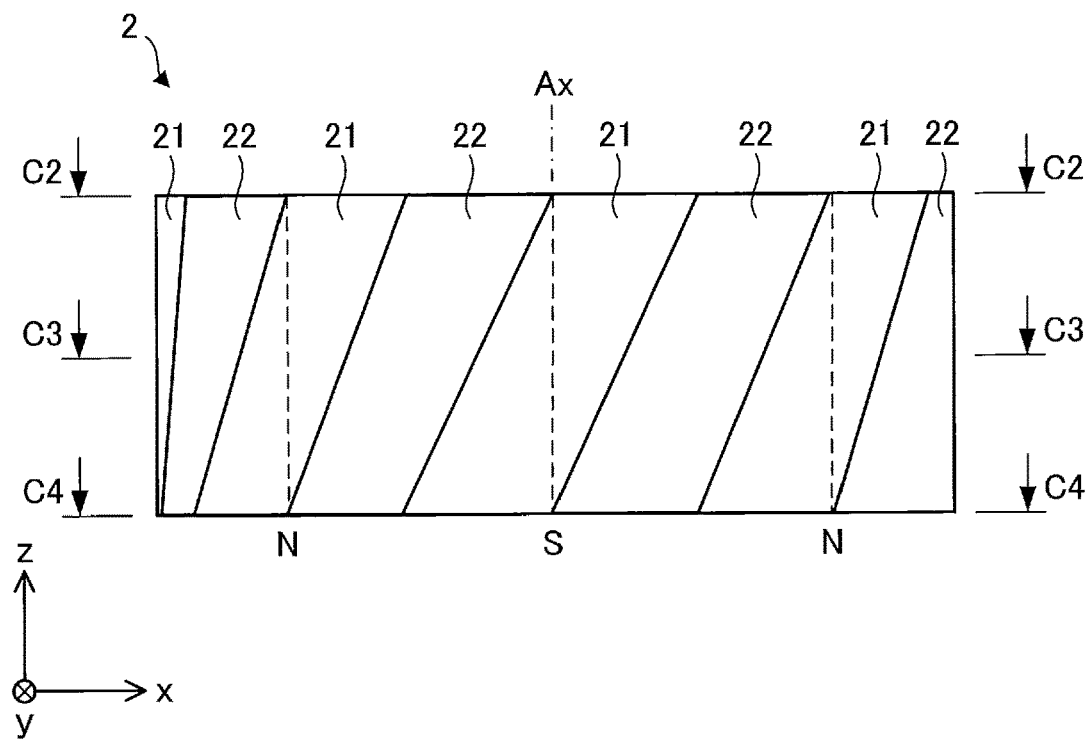
FIG. 1 is a side view schematically illustrating a structure of a rotor according to a first embodiment of the present invention.

FIG. 1 is a side view schematically illustrating a structure of the rotor 2 according to a first embodiment of the present invention. In FIG. 1, broken lines represent positions of magnetic poles (north poles or south poles) of the rotor 2.

Figure 2:
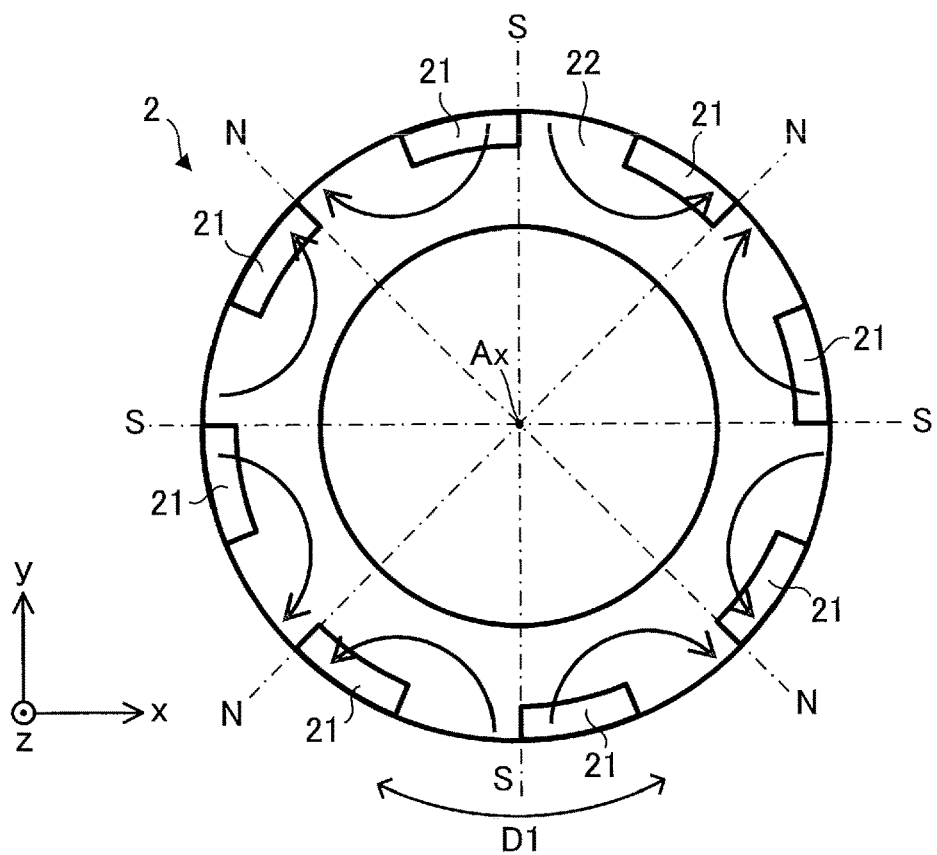
FIG. 2 is a plan view schematically illustrating the structure of the rotor.

FIG. 2 is a plan view schematically illustrating the structure of the rotor 2.

Figure 3:
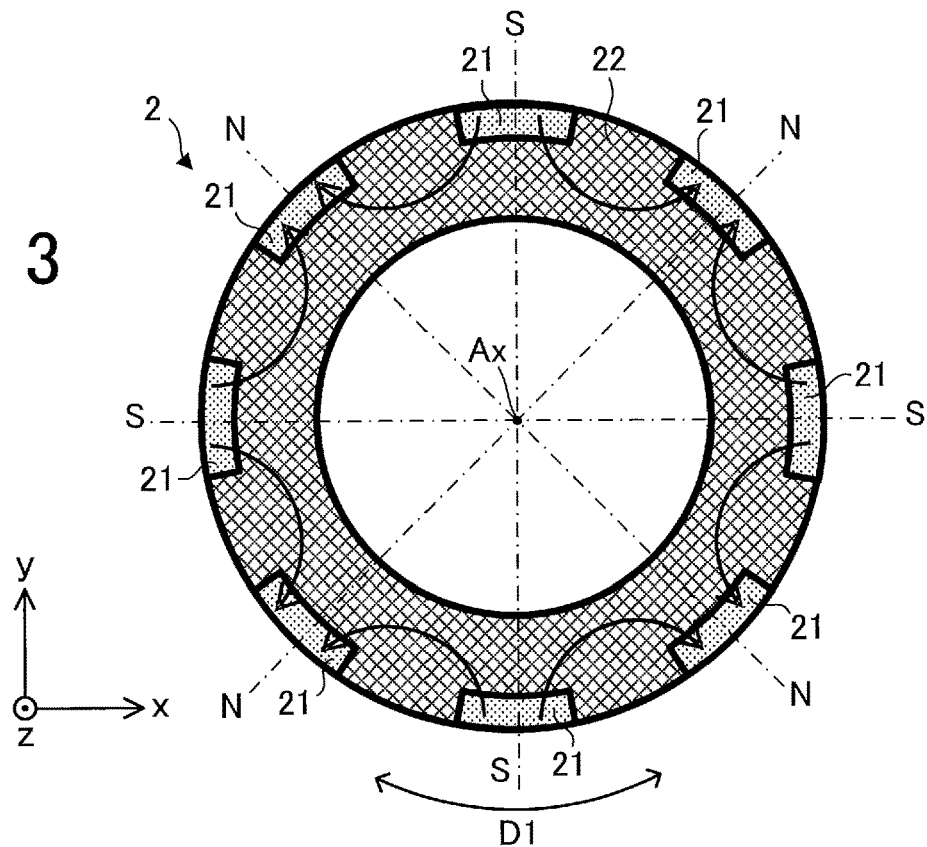
FIG. 3 is a cross-sectional view schematically illustrating the structure of the rotor.
Figure 4:
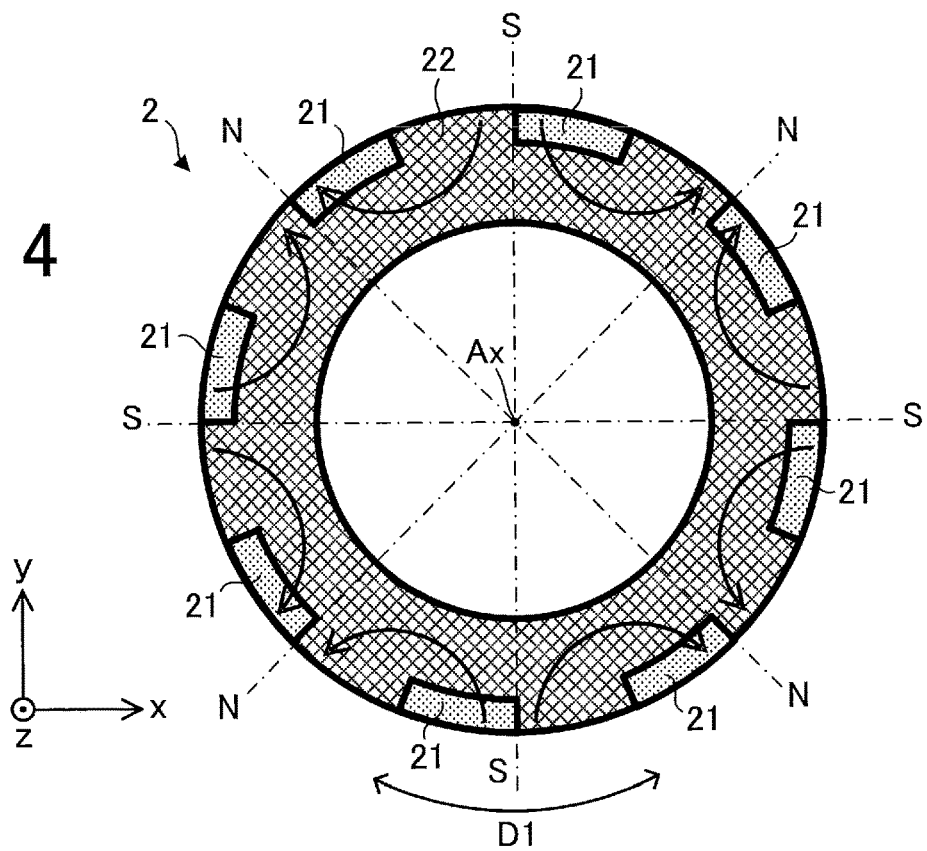
FIG. 4 is a cross-sectional view schematically illustrating the structure of the rotor.

FIGS. 3 and 4 are cross-sectional views schematically illustrating the structure of the rotor 2.

FIG. 2 is a plan view taken along line C2-C2 in FIG. 1. FIG. 3 is a cross-sectional view taken along line C3-C3 in FIG. 1. FIG. 4 is a cross-sectional view taken along line C4-C4 in FIG. 1.

In FIGS. 2 through 4, arrows on the rotor 2 represent directions of main magnetic flux.

The rotor 2 is used for an electric motor (e.g., the electric motor 1 described later).

The rotor 2 includes at least one first permanent magnet 21 and at least one second permanent magnet 22 that is a different type from the first permanent magnet 21.

The "at least one first permanent magnet 21" includes two or more first permanent magnets 21. The "at least one second permanent magnet 22" includes two or more second permanent magnets 22.

The rotor 2 has 2n (n is a natural number) magnetic poles. In this embodiment, n is 4, and the rotor 2 has eight magnetic poles. In this embodiment, the rotor 2 includes eight first permanent magnets 21 and one second permanent magnet 22. For example, as illustrated in FIG. 1, the north poles of the first permanent magnets 21 and the south poles of the first permanent magnets 21 are alternately arranged on the outer peripheral surface of the rotor 2. It should be noted that the plurality of first permanent magnets 21 may be coupled to each other by, for example, ring-shaped coupling parts, and the second permanent magnet 22 may be divided into a plurality of parts.

Each first permanent magnet 21 forms part of the outer peripheral surface of the rotor 2. Each first permanent magnet 21 is magnetized to have polar anisotropy. In other words, each first permanent magnet 21 is magnetized so that the rotor 2 has polar anisotropy. Each first permanent magnet 21 is a rare earth magnet. For example, each first permanent magnet 21 is a bonded magnet as a mixture of a rare earth magnet and a resin, that is, a rare earth bonded magnet. Each first permanent magnet 21 has higher magnetic force than that of the second permanent magnet 22.

The rare earth magnet is, for example, a magnet containing neodymium (Nd)— iron (Fe)— boron (B) or a magnet containing samarium (Sm)— iron (Fe)— nitrogen (N). The resin is, for example, a nylon resin, a polyphenylene sulfide (PPS) resin, or an epoxy resin.

The second permanent magnet 22 is adjacent to the first permanent magnets 21 in the circumferential direction of the rotor 2, and forms part of the outer peripheral surface of the rotor 2. Specifically, part of the second permanent magnet 22 is adjacent to the first permanent magnets 21 in the circumferential direction of the rotor 2, and another part of the second permanent magnet 22 is located on the inner side with respect to the first permanent magnets 21 in the radial direction of the rotor 2. Thus, the second permanent magnet 22 is a ring-shaped magnet.

In the examples illustrated in FIGS. 1 and 2, on the outer peripheral surface of the rotor 2, the plurality of first permanent magnets 21 and a plurality of parts of the second permanent magnet 22 are alternately arranged in the circumferential direction of the rotor 2.

The second permanent magnet 22 is magnetized to have polar anisotropy. In other words, the second permanent magnet 22 is magnetized so that the rotor 2 has polar anisotropy. In this embodiment, the second permanent magnet 22 is a single integral magnet. The second permanent magnet 22 constitutes magnetic poles in the rotor 2 together with the first permanent magnets 21.

The second permanent magnet 22 is a magnet that is a different type from the first permanent magnets 21. The second permanent magnet 22 is a ferrite magnet. For example, the second permanent magnet 22 is a bonded magnet as a mixture of a ferrite magnet and a resin, that is, a ferrite bonded magnet. The resin is, for example, a nylon resin, a polyphenylene sulfide (PPS) resin, or an epoxy resin.

The second permanent magnet 22 has lower magnetic force than that of each first permanent magnet.

In the xy plane, the inner peripheral surfaces and the outer peripheral surfaces of the first permanent magnets 21 are concentrically formed. That is, the thickness of the first permanent magnets 21 in the xy plane is uniform in the circumferential direction.

Figure 5:
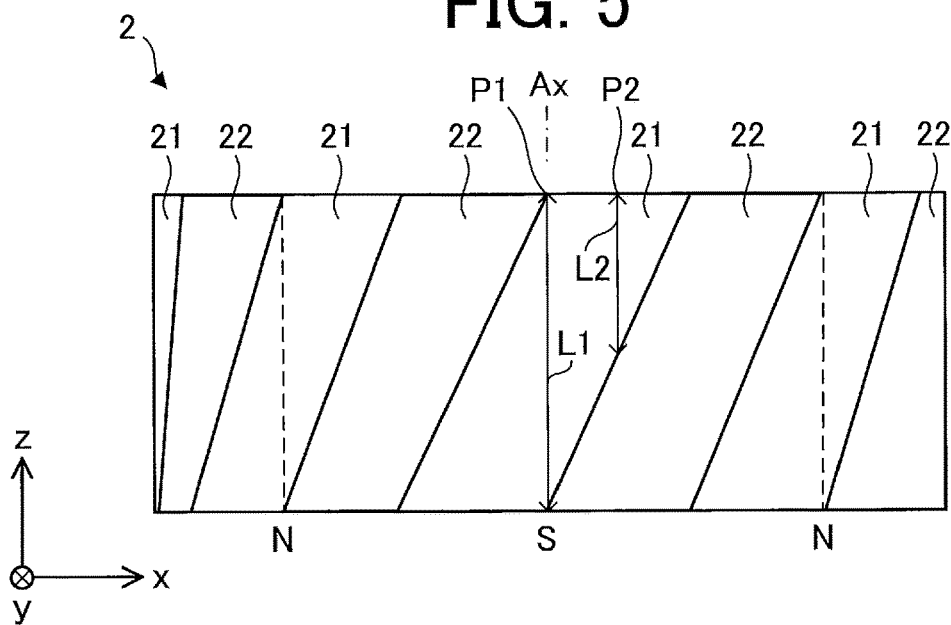
FIG. 5 is a diagram showing a length of a first permanent magnet in an axial direction of the rotor.

FIG. 5 is a diagram showing a length of the first permanent magnets 21 in the axial direction of the rotor 2.

The length of the first permanent magnets 21 in the axial direction of the rotor 2 is longest at a center P1 of the first permanent magnets 21 in the circumferential direction of the rotor 2. The center P1 of the first permanent magnets 21 in the circumferential direction of the rotor 2 is located on the magnetic pole center of the rotor 2 in the xy plane. That is, as illustrated in FIG. 5, a length L1 at the center P1 is longest in the first permanent magnets 21.

As illustrated in FIG. 5, the length of the first permanent magnets 21 in the axial direction of the rotor 2 gradually decreases with being away from the center P1 along the circumferential direction. For example, as illustrated in FIG. 1, a length L2 at a position P2 away from the center P1 in the circumferential direction is smaller than the length L1. In other words, the length of the first permanent magnets 21 in the axial direction gradually decreases toward an inter-pole part from a magnetic pole center part (i.e., the center P1). The inter-pole part is located at the center of two magnetic poles (i.e., a north pole and a south pole) adjacent to each other in the circumferential direction.

An example of a method for fabricating the rotor 2 will be described.

Figure 6:
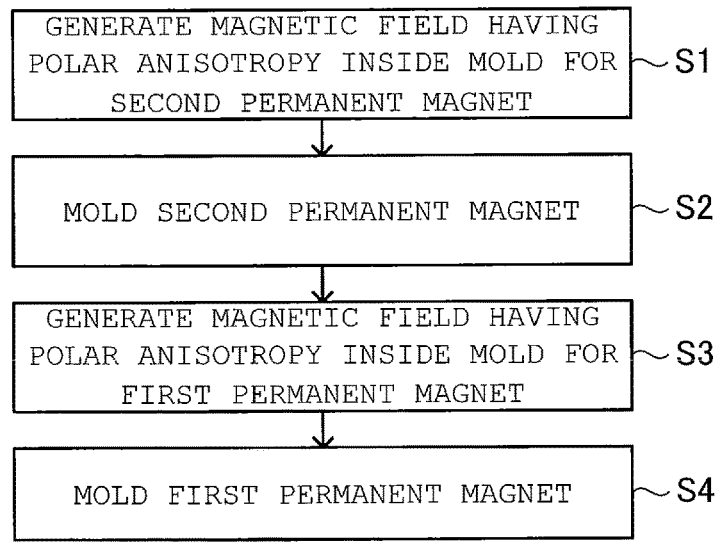
FIG. 6 is a flowchart depicting an example of a process for fabricating the rotor.

FIG. 6 is a flowchart depicting an example of a process for fabricating the rotor 2.

Figure 7:
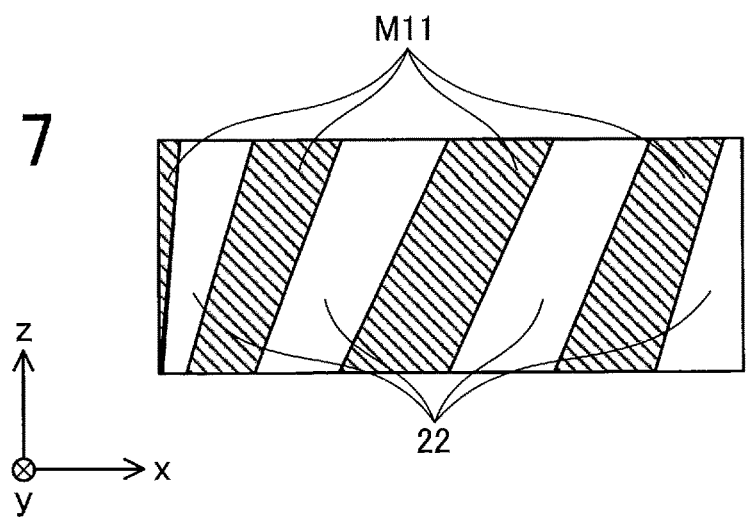
FIG. 7 is a diagram illustrating an example of a molding process of a second permanent magnet.
Figure 8:
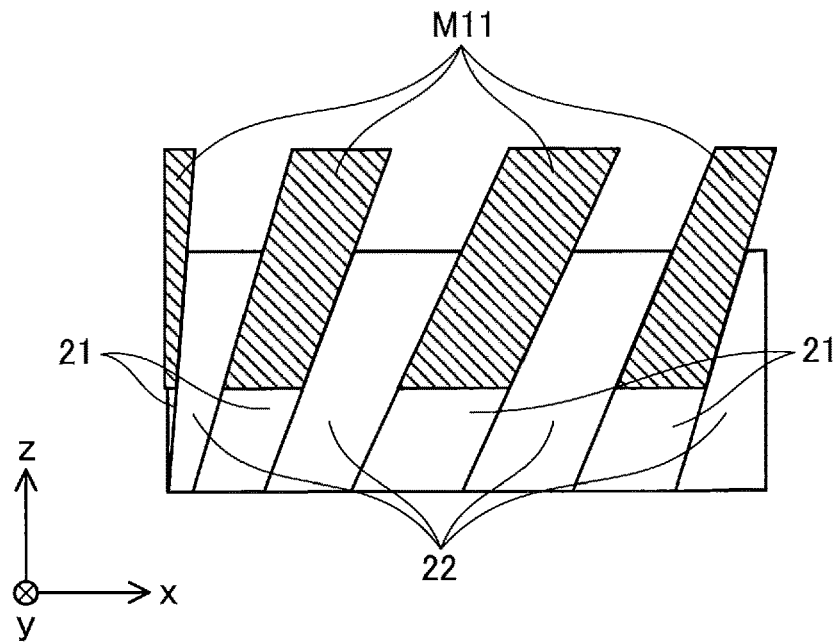
FIG. 8 is a diagram illustrating an example of the molding process of the second permanent magnet.

FIGS. 7 and 8 are diagrams illustrating an example of a molding process of the second permanent magnet 22.

In a first step S1, a magnetic field having polar anisotropy is generated inside a mold M11 for the second permanent magnet 22 by using a magnet for magnetization.

In a second step S2, the second permanent magnet 22 is molded. Specifically, in the mold M11, the second permanent magnet 22 is molded by injection molding (FIG. 7). In this manner, the second permanent magnet 22 magnetized to have polar anisotropy is molded. In addition, as illustrated in FIG. 8, the mold M11 is pulled out and consequently the second permanent magnet 22 magnetized to have polar anisotropy is obtained.

Since a mold corresponding to the shape of each first permanent magnet 21 is formed in the mold M11, the shape of the first permanent magnets 21 is molded on the outer peripheral surface of the second permanent magnet 22 concurrently with obtainment of the second permanent magnet 22.

In a third step S3, a magnetic field having polar anisotropy is generated inside the mold for the first permanent magnets 21 by using a magnet for magnetization.

In a fourth step S4, one or more first permanent magnets 21 are molded. Specifically, one or more first permanent magnets 21 are molded by injection molding on the outer peripheral surface of the second permanent magnet 22 so that the one or more first permanent magnets 21 form part of the outer peripheral surface of the rotor 2, in the state where the second permanent magnet 22 is disposed inside the mold for the first permanent magnets 21. In this manner, one or more first permanent magnets 21 magnetized to have polar anisotropy are molded and thus the rotor 2 is obtained.

Advantages of the rotor 2 according to the first embodiment will be described.

Figure 9:
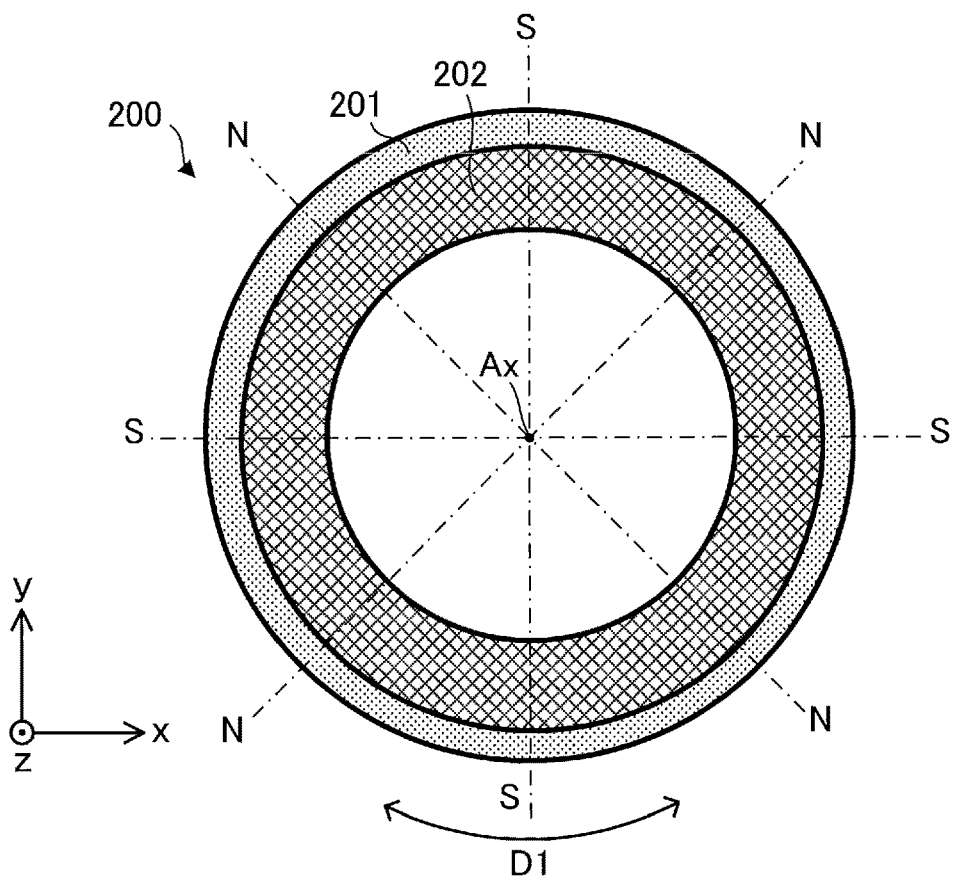
FIG. 9 is a cross-sectional view schematically illustrating a structure of a rotor according to a comparative example.

FIG. 9 is a cross-sectional view schematically illustrating a structure of a rotor 200 according to a comparative example. In the rotor 200 according to the comparative example illustrated in the FIG. 9, a ring-shaped rare earth bonded magnet 201 having higher magnetic force than that of a cylindrical ferrite bonded magnet 202 is disposed on the outer peripheral surface of the ferrite bonded magnet 202. The ring-shaped rare earth bonded magnet 201 extends in the circumferential direction of the rotor 200, and the thickness of the rare earth bonded magnet 201 in the xy plane is uniform in the axial direction of the rotor 200. That is, the ring-shaped rare earth bonded magnet 201 forms the entire outer peripheral surface of the rotor 200.

On the other hand, the rotor 2 according to the first embodiment includes a plurality of first permanent magnets 21. The first permanent magnets 21 form part of the outer peripheral surface of the rotor 2, and do not form the entire outer peripheral surface of the rotor 2. Accordingly, the amount of the first permanent magnets 21 having high magnetic force can be reduced, as compared to the rotor 200 according to the comparative example. In the case where the first permanent magnets 21 are expensive rare earth bonded magnets, the amount of rare earth bonded magnets can be reduced as compared to the rotor 200 according to the comparative example, and thus, the cost of the rotor 2 can be reduced.

Figure 10:
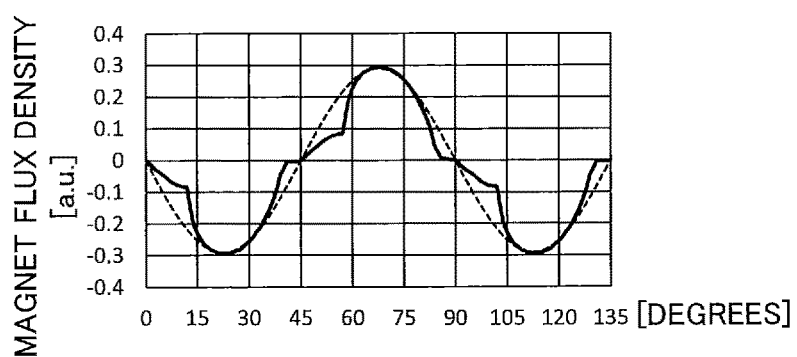
FIG. 10 is a diagram showing a magnetic flux density distribution on an outer peripheral surface of the rotor and corresponding to a vicinity of a cross section of the rotor illustrated in FIG. 2.

FIG. 10 is a diagram showing a magnetic flux density distribution on the outer peripheral surface of the rotor 2 and corresponding to a vicinity of the cross section of the rotor 2 illustrated in FIG. 2. Specifically, FIG. 10 is a diagram showing a magnetic flux density distribution at a position E1 illustrated in FIGS. 14 and 15.

Figure 11:
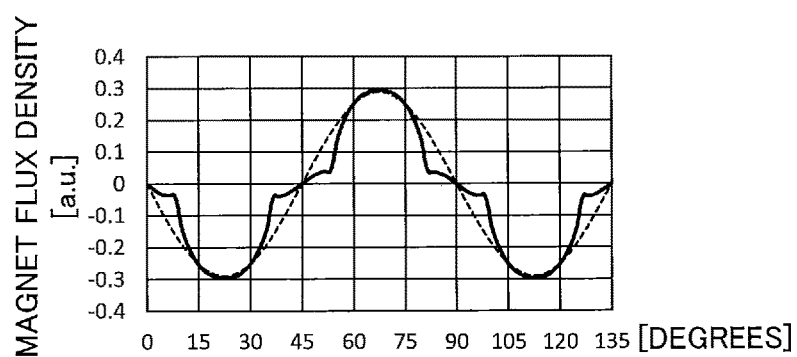
FIG. 11 is a diagram showing a magnetic flux density distribution on the outer peripheral surface of the rotor and corresponding to a vicinity of the cross section of the rotor illustrated in FIG. 3.

FIG. 11 is a diagram showing a magnetic flux density distribution on the outer peripheral surface of the rotor 2 and corresponding to a vicinity of the cross section of the rotor 2 illustrated in FIG. 3. Specifically, FIG. 11 is a diagram showing a magnetic flux density distribution at a position E2 illustrated in FIGS. 14 and 15.

Figure 12:
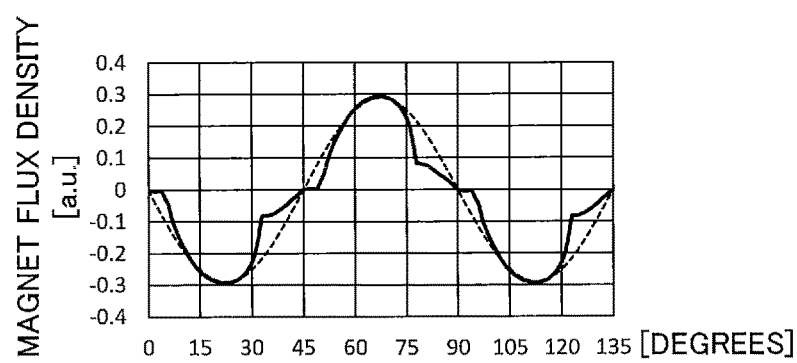
FIG. 12 is a diagram showing a magnetic flux density distribution on the outer peripheral surface of the rotor and corresponding to a vicinity of the cross section of the rotor illustrated in FIG. 4.

FIG. 12 is a diagram showing a magnetic flux density distribution on the outer peripheral surface of the rotor 2 and corresponding to a vicinity of the cross section of the rotor 2 illustrated in FIG. 4. Specifically, FIG. 12 is a diagram showing a magnetic flux density distribution at a position E3 illustrated in FIGS. 14 and 15.

Figure 13:
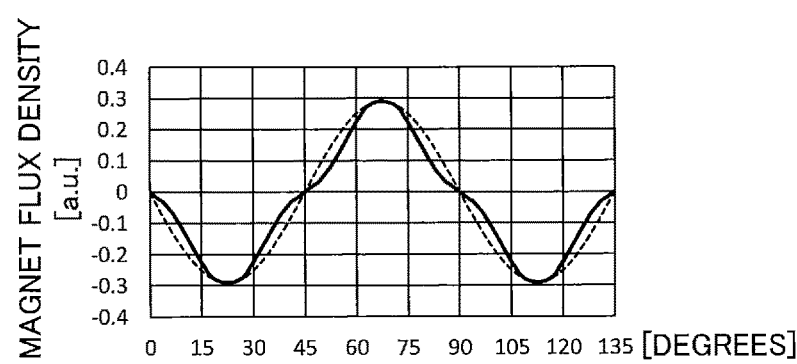
FIG. 13 is a diagram showing a magnetic flux density distribution on the outer peripheral surface of the entire rotor.

FIG. 13 is a diagram showing a magnetic flux density distribution on the outer peripheral surface of the entire rotor 2.

In FIGS. 10 through 13, the horizontal axis represents a relative position [degrees] in the circumferential direction of the rotor 2, and the vertical axis represents a magnetic flux density. In FIGS. 10 through 13, the continuous line represents a magnetic flux density distribution of the rotor 2 according to the first embodiment, and the broken line represents a magnetic flux density distribution of the rotor 200 according to the comparative example.

Figure 14:
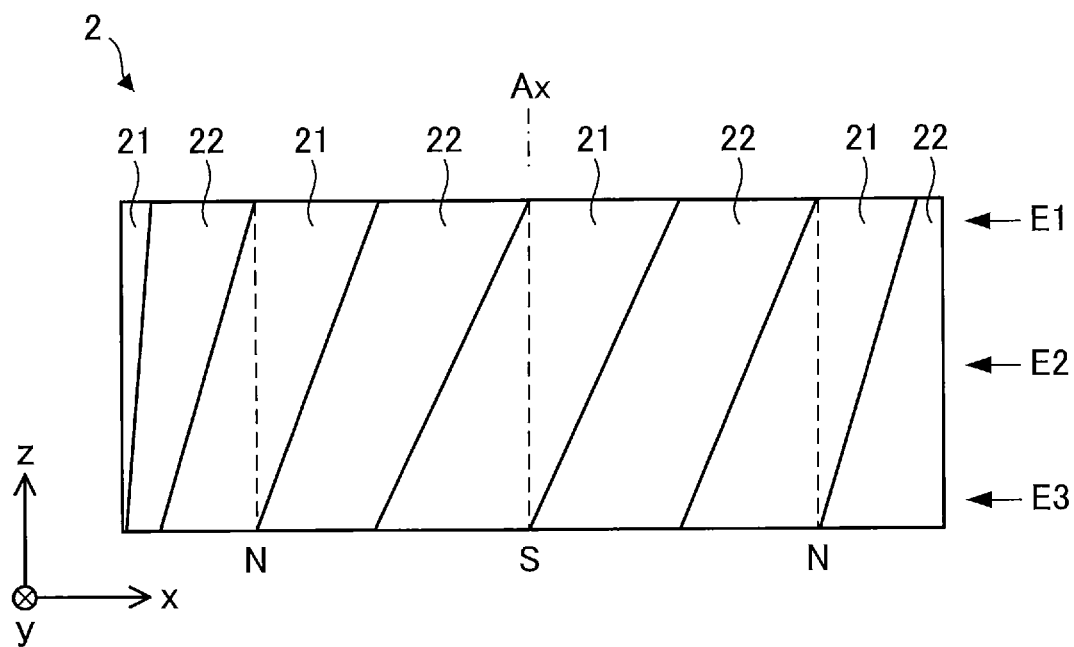
FIG. 14 illustrates a position at which a magnetic flux density distribution on the outer peripheral surface of the rotor according to the first embodiment is detected.

FIG. 14 is a diagram illustrating a position at which a magnetic flux density distribution on the outer peripheral surface of the rotor 2 according to the first embodiment is detected. In FIG. 14, the broken line indicates a position of a magnetic pole center part (a north pole or a south pole) of the rotor 2, "N" represents a north pole, and "S" represents a south pole.

Figure 15:
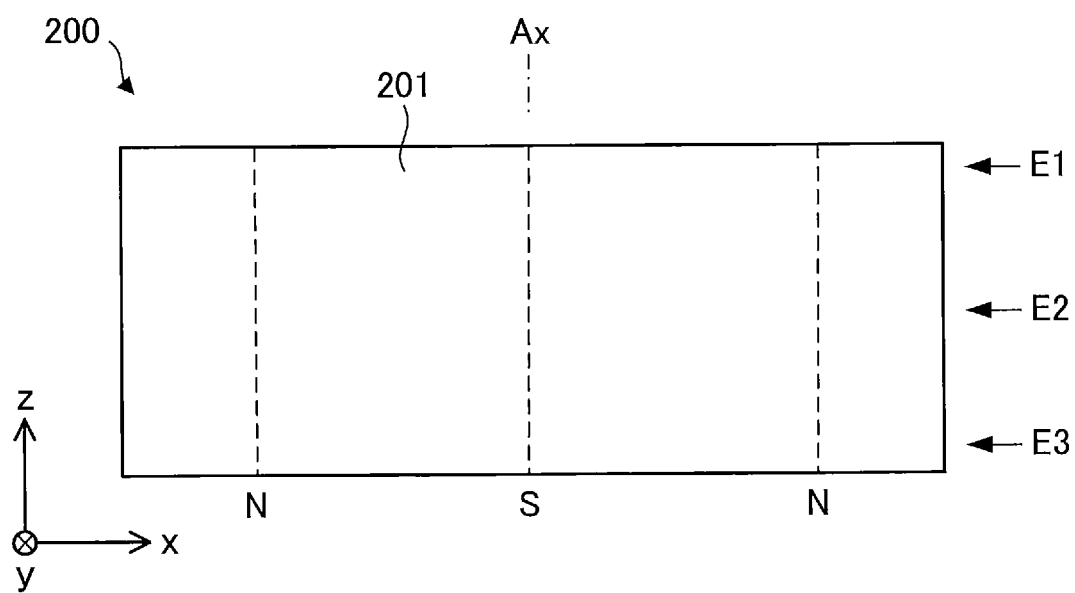
FIG. 15 is a diagram illustrating a position at which a magnetic flux density distribution on the outer peripheral surface of a rotor according to a comparative example is detected.

FIG. 15 is a diagram illustrating a position at which a magnetic flux density distribution on the outer peripheral surface of the rotor 200 according to the comparative example is detected. In FIG. 15, the broken line indicates a position of a magnetic pole center part (a north pole or a south pole) of the rotor 200, "N" represents a north pole, and "S" represents a south pole.

As illustrated in FIGS. 10 through 12, in the rotor 200 according to the comparative example, a sine wave that is uniform in the circumferential direction is formed. On the other hand, in a vicinity of each cross section of the rotor 2 according to the first embodiment, a nonuniform sine wave is formed. However, a magnetic flux density distribution obtained in the entire rotor 2 forms a relatively uniform sine wave as illustrated in FIG. 13. That is, in the entire rotor 2 according to the first embodiment, an abrupt change of the magnetic flux density in the circumferential direction is suppressed. Accordingly, an induced voltage substantially equal to that of the rotor 200 according to the comparative example can be obtained.

As described above, in the rotor 2 according to the first embodiment, the amount of the first permanent magnets 21 having high magnetic force can be reduced, as compared to the rotor 200 according to the comparative example. Specifically, in the rotor 2 according to the first embodiment, since the first permanent magnets 21 form part of the outer peripheral surface of the rotor 2, the amount of the first permanent magnets 21 can be reduced by about 20%, as compared to the rotor 200 according to the comparative example. In general, a material unit price of rare earth magnets is greater than or equal to 10 times that of ferrite magnets. Thus, in the case where a magnet including a rare earth magnet (e.g., a rare earth bonded magnet) is used as the first permanent magnet 21 and a magnet including a ferrite magnet (e.g., a ferrite bonded magnet) is used as the second permanent magnet 22, even when the amount of the second permanent magnet 22 is large, the costs of the first permanent magnets 21 can be significantly reduced. As a result, the cost of the rotor 2 can be significantly reduced.

In addition, as described above, in the rotor 2 according to the first embodiment, even when the amount of the first permanent magnets 21 having high magnetic force is reduced, a sufficient magnetic force of the rotor 2 can be obtained. As a result, an induced voltage substantially equal to that of the rotor 200 according to the comparative example can be obtained, and thus, an accuracy of rotation control substantially equal to that of the rotor 200 of the comparative example can be obtained.

In addition, with the method for fabricating the rotor 2, the rotor 2 having the advantages described above can be fabricated.

First Variation

Figure 16:
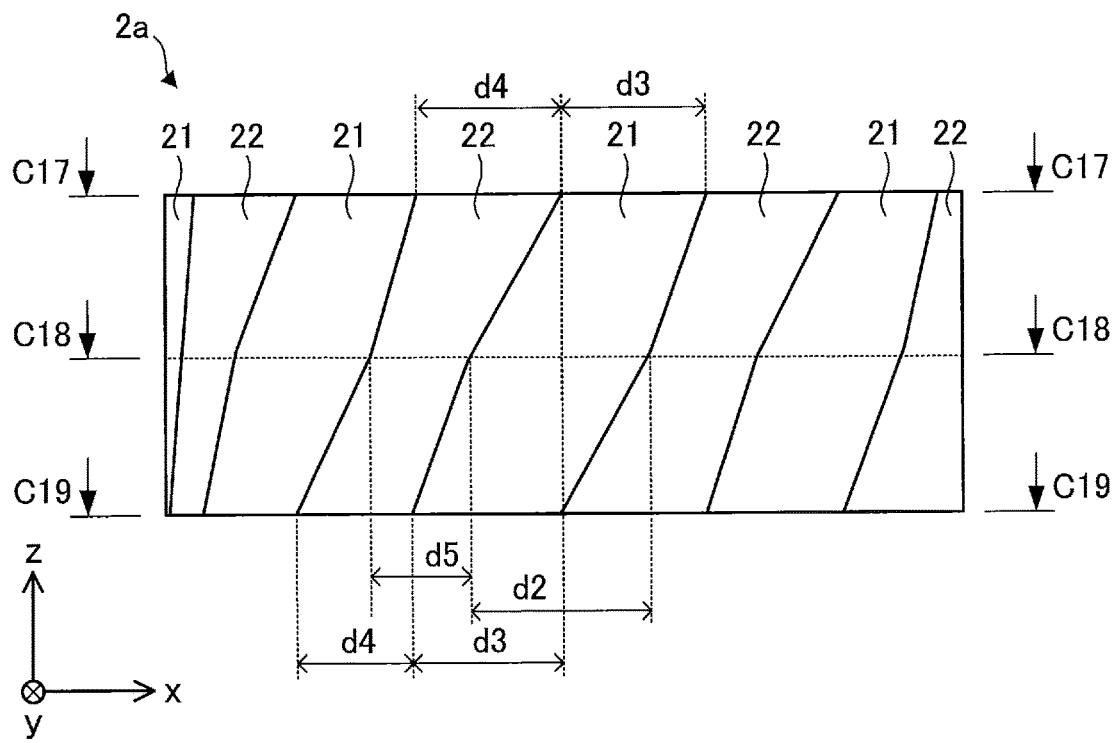
FIG. 16 is a side view schematically illustrating a structure of a rotor according to a first variation.

FIG. 16 is a side view schematically illustrating a structure of a rotor 2a according to a first variation.

Figure 17:
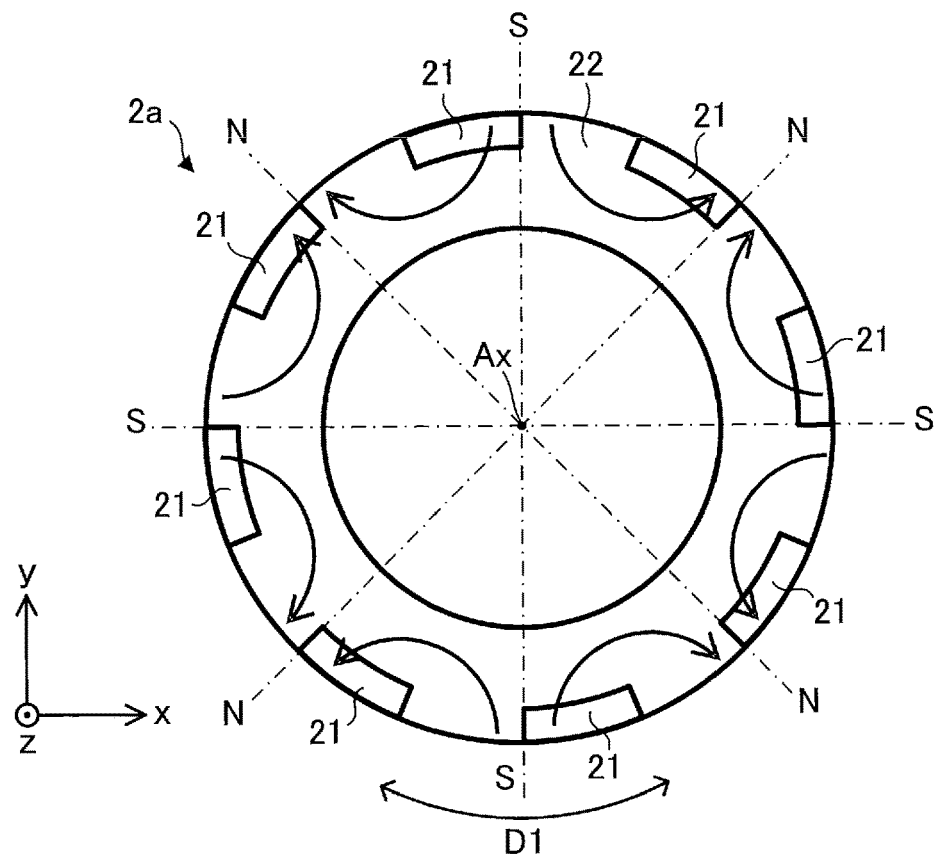
FIG. 17 is a plan view schematically illustrating the structure of the rotor according to the first variation.

FIG. 17 is a plan view schematically illustrating the structure of the rotor 2a according to the first variation.

Figure 18:
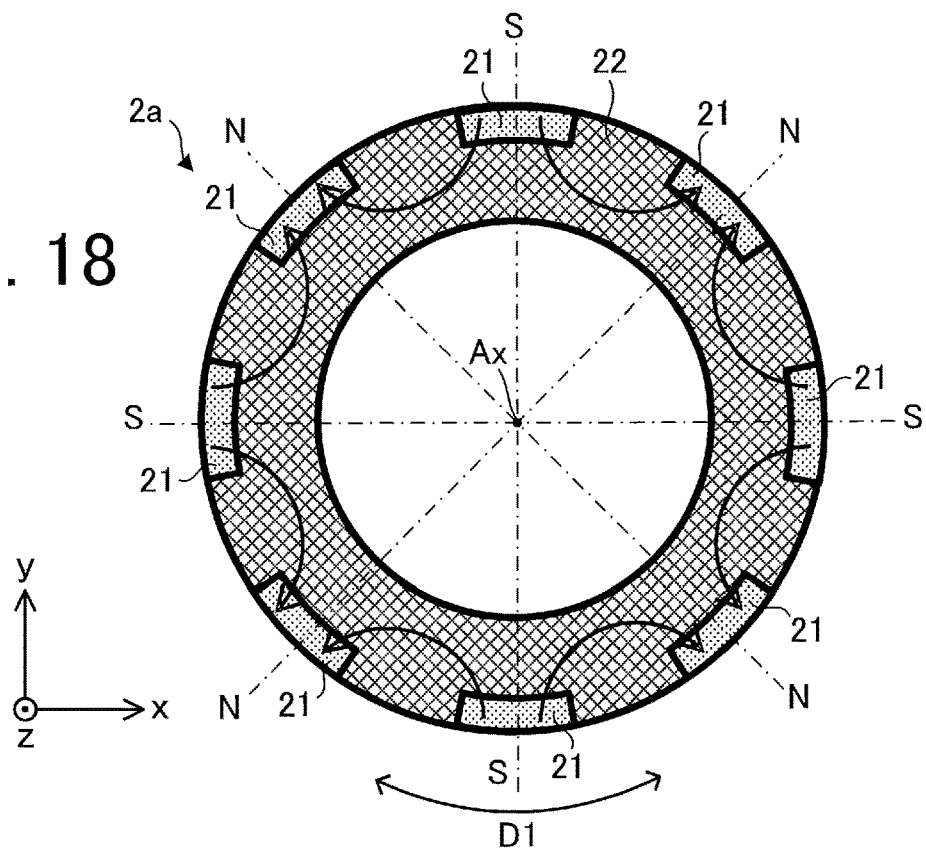
FIG. 18 is a cross-sectional view schematically illustrating the structure of the rotor according to the first variation.
Figure 19:
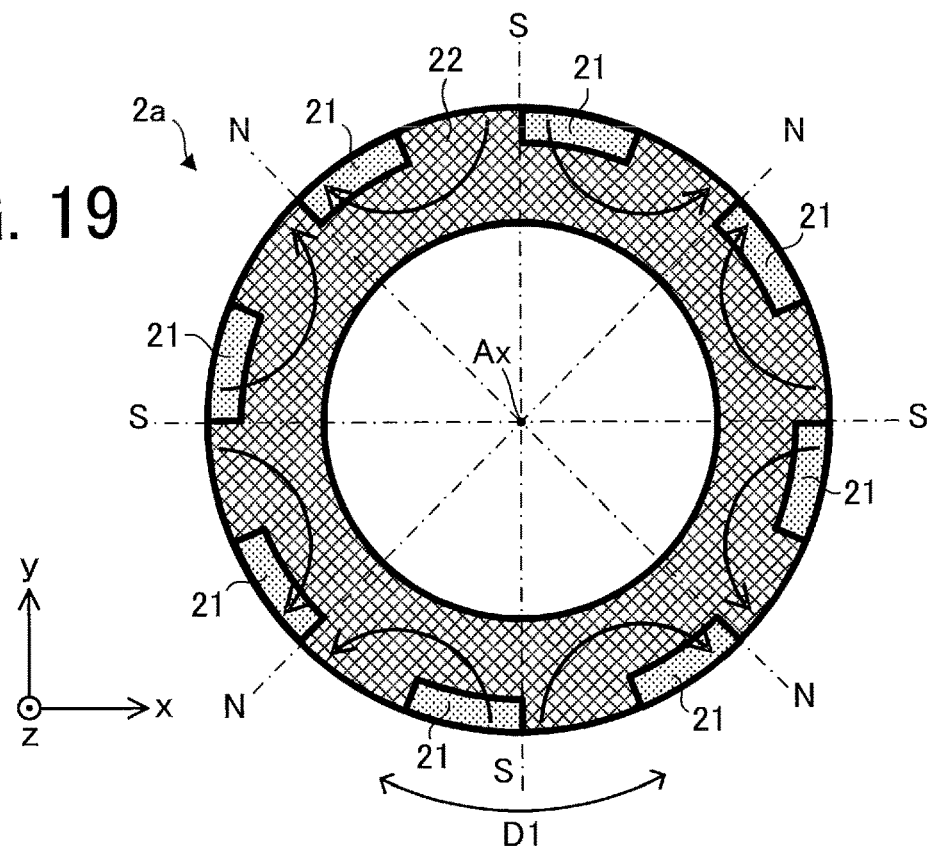
FIG. 19 is a cross-sectional view schematically illustrating the structure of the rotor according to the first variation.

FIGS. 18 and 19 are cross-sectional views schematically illustrating the structure of the rotor 2a according to the first variation.

FIG. 17 is a plan view taken along line C17-C17 in FIG. 16. FIG. 18 is a cross-sectional view taken along line C18-C18 in FIG. 16. FIG. 19 is a cross-sectional view taken along line C19-C19 in FIG. 16.

In the rotor 2a according to the first variation, the width of each first permanent magnet 21 in the circumferential direction of the rotor 2a varies in the axial direction of the rotor 2a. Specifically, in each first permanent magnet 21, the width of the first permanent magnet 21 in the circumferential direction of the rotor 2a is largest at the center in the axial direction of the rotor 2a. This largest width is indicated by d2 in FIG. 16. In each first permanent magnet 21, the width in the circumferential direction is smallest at an end portion in the axial direction. This smallest width is indicated by d3 in FIG. 16. That is, a relationship between the width d2 and the width d3 satisfies d2>d3 in each first permanent magnet 21.

In this case, the width of the outer peripheral surface of a second permanent magnet 22 in the circumferential direction varies in the axial direction. Specifically, the width of the outer peripheral surface of the second permanent magnet 22 in the circumferential direction is largest in an end portion in the axial direction. This largest width is indicated by d4 in FIG. 16. The width of the outer peripheral surface of the second permanent magnet 22 in the circumferential direction is smallest at the center in the axial direction. This smallest width is indicated by d5 in FIG. 16. That is, a relationship between the width d4 and the width d5 satisfies d4>d5 in the second permanent magnet 22.

A method for fabricating the rotor 2a according to the first variation will be described.

Figure 20:
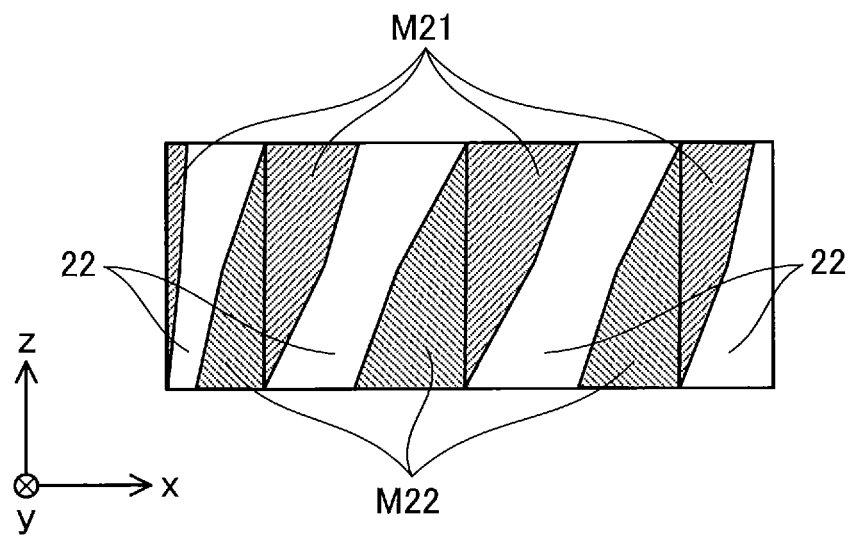
FIG. 20 is a diagram illustrating an example of a process for fabricating the rotor according to the first variation.
Figure 21:
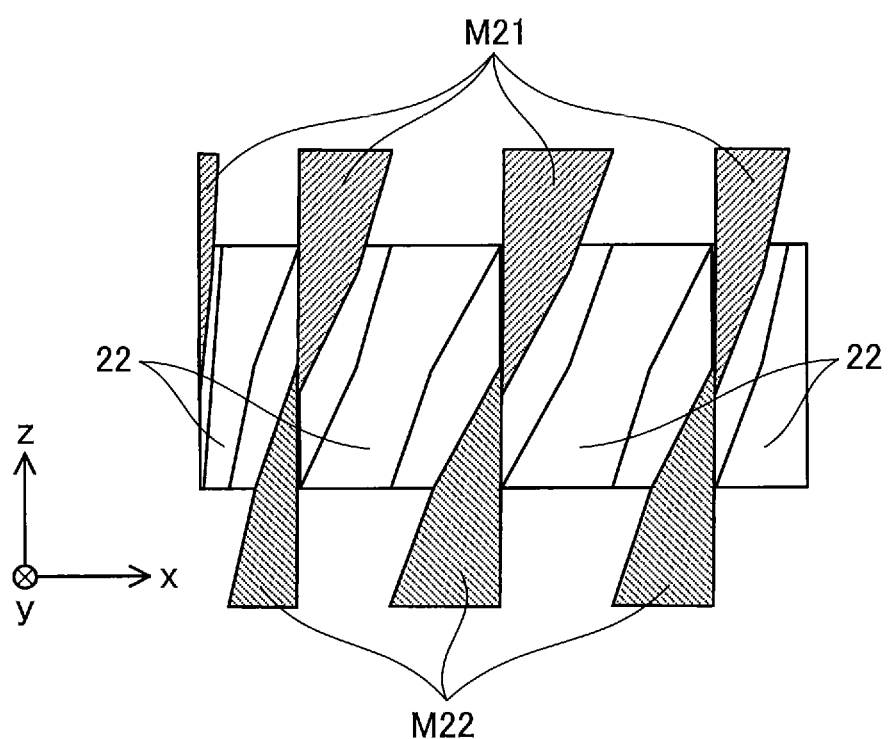
FIG. 21 is a diagram illustrating an example of the process for fabricating the rotor according to the first variation.

FIGS. 20 and 21 are diagrams illustrating an example of a process for fabricating the rotor 2a according to the first variation. Specifically, FIGS. 20 and 21 are diagrams illustrating a molding process of the second permanent magnet 22.

In the molding process of the second permanent magnet 22, the second permanent magnet 22 is molded by using molds divided into two, that is, a mold M21 and a mold M22.

In a first step, a magnetic field having polar anisotropy is generated inside the mold M21 and the mold M22 for the second permanent magnet 22 by using a magnet for magnetization.

In a second step, the second permanent magnet 22 is molded. Specifically, in the mold M21 and the mold M22, the second permanent magnet 22 is injection-molded (FIG. 20). In this manner, the second permanent magnet 22 magnetized to have polar anisotropy is molded. In addition, as illustrated in FIG. 21, the mold M21 and the mold M22 are pulled out in opposite directions and consequently the second permanent magnet 22 magnetized to have polar anisotropy is obtained.

Since molds corresponding to the shape of each first permanent magnet 21 is formed in the mold M21 and the mold M22, the shape of the first permanent magnet 21 is molded on the outer peripheral surface of the second permanent magnet 22 concurrently with obtainment of the second permanent magnet 22.

In a third step, a magnetic field having polar anisotropy is generated inside the molds for the first permanent magnet 21 by using a magnet for magnetization.

In a fourth step, one or more first permanent magnets 21 are molded. Specifically, with the second permanent magnet 22 being disposed inside the molds for the first permanent magnets 21, one or more first permanent magnets 21 are injection-molded on the outer peripheral surface of the second permanent magnet 22 to form part of the outer peripheral surface of the rotor 2a. In this manner, one or more first permanent magnets 21 magnetized to have polar anisotropy are molded and thus the rotor 2 is obtained.

The other part of the structure of the rotor 2a is the same as that of the rotor 2 according to the first embodiment. The rotor 2a according to the first variation has the same advantages as the advantages of the rotor 2 according to the first embodiment described above.

In addition, in the rotor 2a according to the first variation, a magnetic flux density distribution obtained in the entire rotor 2a can be made as a more uniform sine wave. Accordingly, a proportion of a harmonic component in the induced voltage can be reduced and thus distortion of the induced voltage decreases. As a result, during driving of an electric motor, pulsations of a torque of the electric motor decreases and thus vibrations and noise in the electric motor can be reduced.

In the method for fabricating the rotor 2a according to the first variation, the rotor 2a having the advantages described above can be fabricated. In addition, in the method for fabricating the rotor 2a, the use of the divided molds M21 and M22 can increase flexibility in the shape of each first permanent magnet 21. Furthermore, according to the method for fabricating the rotor 2a, since the divided molds M21 and M22 are used, the mold M21 and the mold M22 can be easily pulled out from the second permanent magnet 22.

Second Variation

Figure 22:
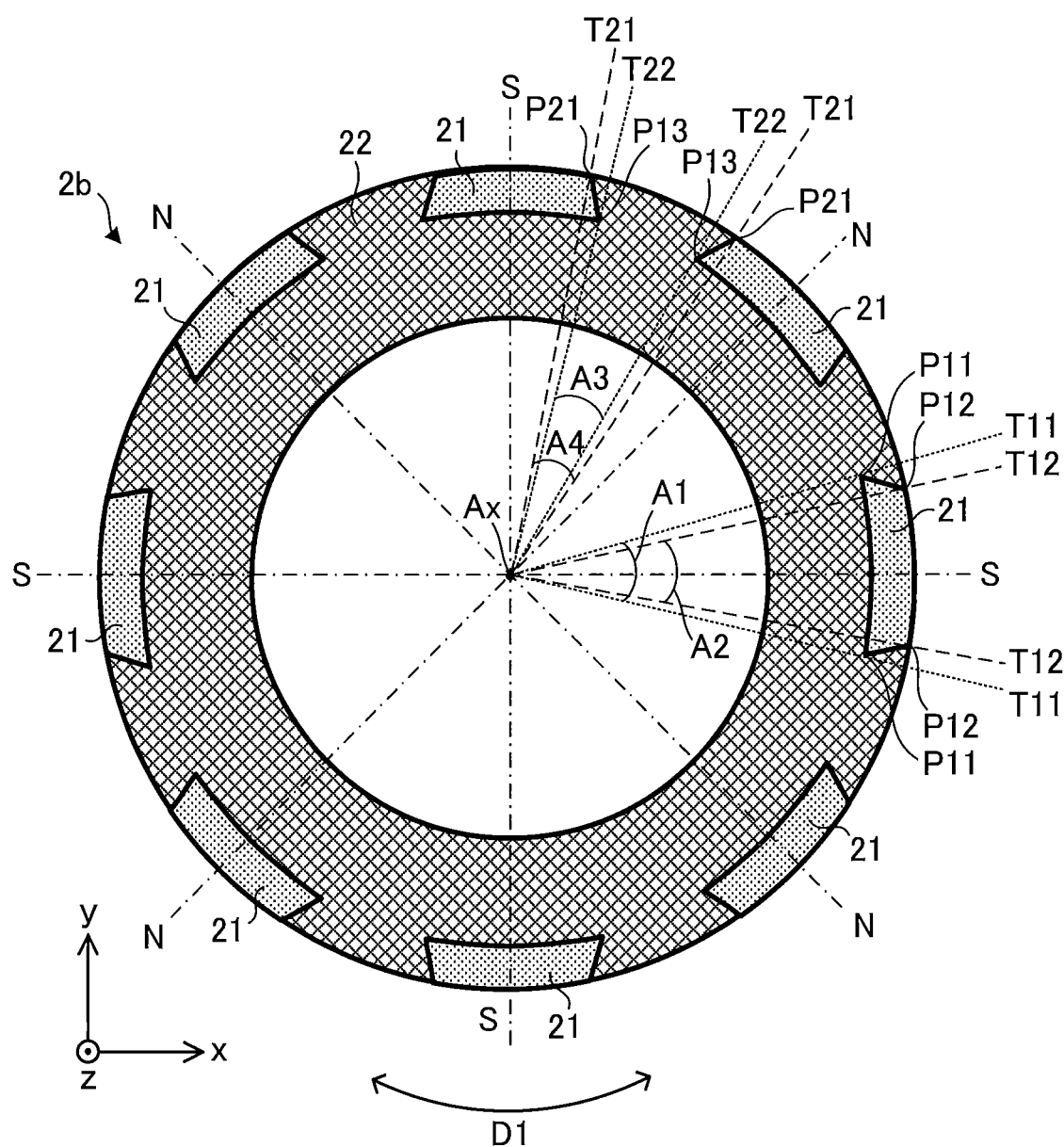
FIG. 22 is a cross-sectional view schematically illustrating a structure of a rotor according to a second variation.

FIG. 22 is a cross-sectional view schematically illustrating a structure of a rotor 2b according to a second variation.

In the xy plane, an angle A1 formed by two lines T11 passing through a rotation center (i.e., an axis Ax) of the rotor 2b and both ends P11 of the inner peripheral surface of a first permanent magnet 21 is larger than an angle A2 formed by two lines T12 passing through the rotation center of the rotor 2b and both ends P12 of the outer peripheral surface of the first permanent magnet 21. The inner peripheral surface of the first permanent magnet 21 is the surface facing inward in the radial direction, of the first permanent magnet 21. The outer peripheral surface of the first permanent magnet 21 is the surface facing outward in the radial direction, of the first permanent magnet 21.

Accordingly, a centrifugal force generated during rotation of the rotor 2b can prevent detachment of the first permanent magnet 21 from the second permanent magnet 22.

In the xy plane, an angle A3 is smaller than an angle A4. Accordingly, a centrifugal force generated during rotation of the rotor 2b can prevent detachment of the first permanent magnet 21 from the second permanent magnet 22. In the xy plane, the angle A3 is an angle formed by two lines T22 passing through adjacent end portions P13 of the inner peripheral surfaces of two first permanent magnets 21, and these end portions P13 are adjacent to each other in the circumferential direction of the rotor 2b. In other words, the two end portions P13 face each other in the circumferential direction of the rotor 2. In the xy plane, the angle A4 is an angle formed by two lines T21 passing through both ends P21 of the outer peripheral surface of the second permanent magnet 22 between two first permanent magnets 21. The outer peripheral surface of the second permanent magnet 22 is the surface of the second permanent magnet 22 facing outward in the radial direction.

Third Variation

Figure 23:
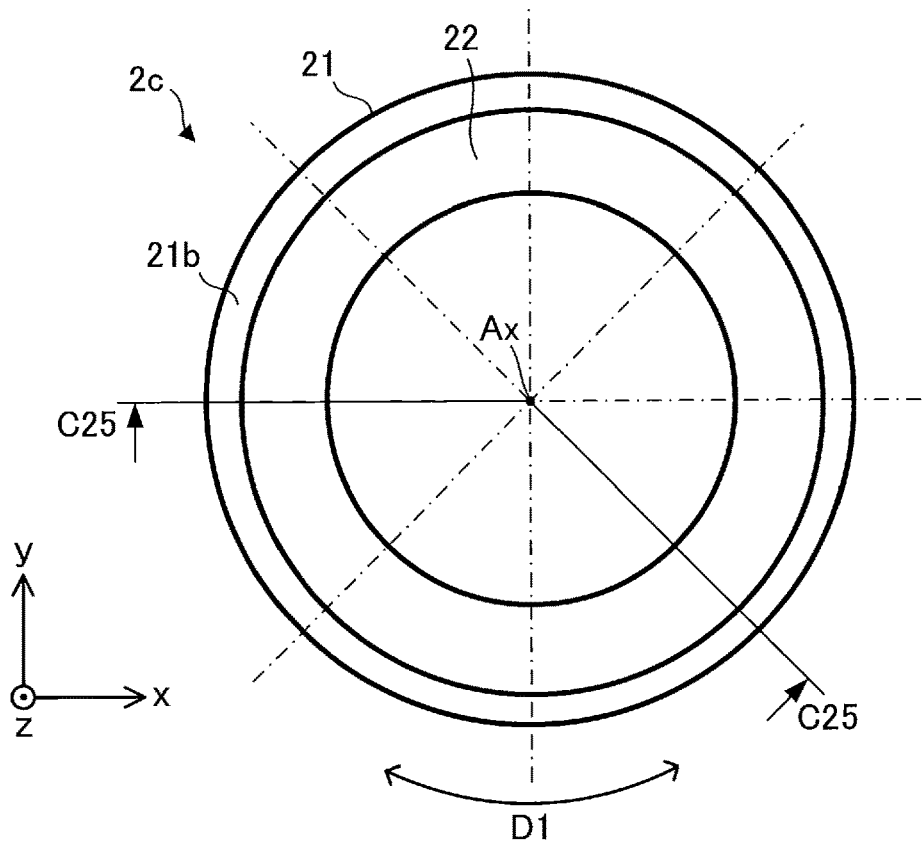
FIG. 23 is a plan view schematically illustrating a structure of a rotor according to a third variation.

FIG. 23 is a plan view schematically illustrating a structure of a rotor 2c according to a third variation.

Figure 24:
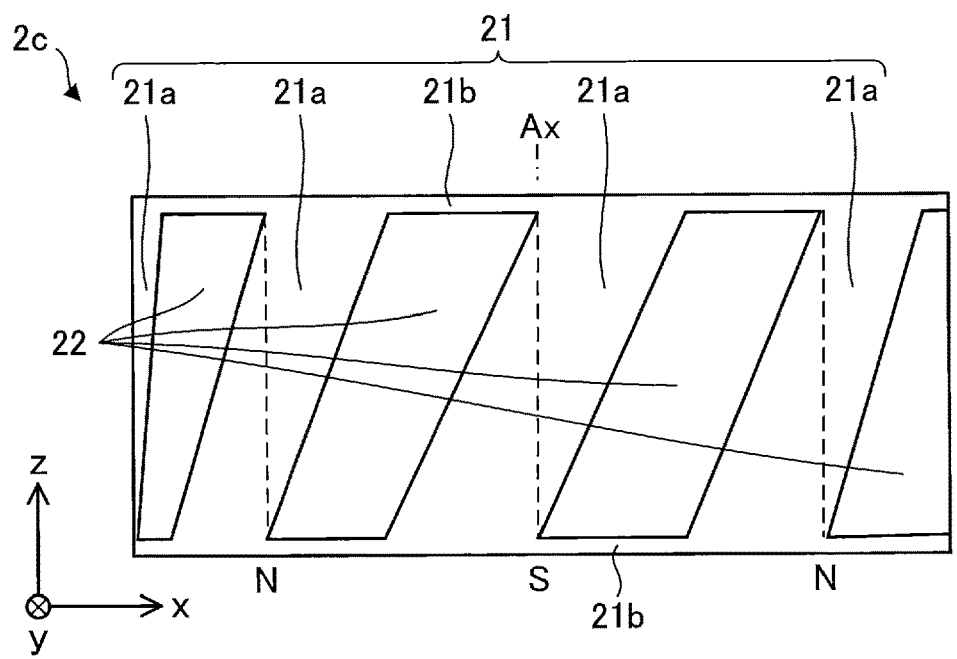
FIG. 24 is a side view schematically illustrating the structure of the rotor according to the third variation.

FIG. 24 is a side view schematically illustrating the structure of the rotor 2c according to the third variation.

Figure 25:
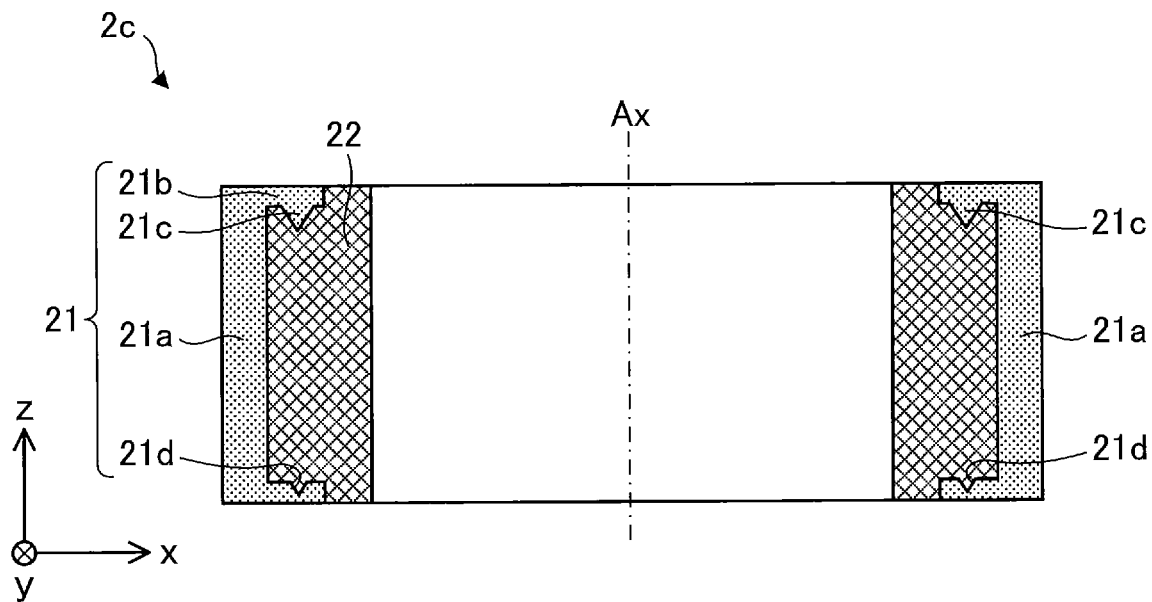
FIG. 25 is a cross-sectional view schematically illustrating the structure of the rotor according to the third variation.

FIG. 25 is a cross-sectional view schematically illustrating the structure of the rotor 2c according to the third variation. Specifically, FIG. 25 is a cross-sectional view taken along line C25-C25 in FIG. 23.

In the rotor 2c according to the third variation, a first permanent magnet 21 is integral. The first permanent magnet 21 includes a plurality of bodies 21a and at least one ring-shaped portion 21b. The plurality of bodies 21a correspond to the first permanent magnets 21 in the first embodiment (the first permanent magnets 21 illustrated in FIG. 1). Thus, each of the bodies 21a forms part of the outer peripheral surface of the rotor 2c and is magnetized to have polar anisotropy. Part of a second permanent magnet 22 is present between two bodies 21a adjacent to each other in the circumferential direction.

The ring-shaped portion 21b is integrated with the plurality of bodies 21a. Thus, in the third variation, the rotor 2c includes one first permanent magnet 21 and one second permanent magnet 22. In the example illustrated in FIG. 24, the ring-shaped portion 21b is formed at each end of the first permanent magnet 21 in the axial direction. It should be noted that the ring-shaped portion 21b may be formed at one end of the first permanent magnet 21 in the axial direction. Each ring-shaped portion 21b covers an end portion of the second permanent magnet 22 in the axial direction of the rotor 2c.

As illustrated in FIG. 25, each ring-shaped portion 21b may include at least one projection 21c or at least one recess 21d. Each ring-shaped portion 21b may include both at least one projection 21c and at least one recess 21d. The projection 21c projects toward the second permanent magnet 22. For example, the projection 21c is engaged with a recess formed in the second permanent magnet 22. For example, the recess 21d is engaged with a projection formed on the second permanent magnet 22.

In general, when the temperature of a rotor changes, magnets deform in some cases. In such cases, one of two types of magnets might be detached from the rotor because of a difference in thermal shrinkage. In the third variation, since the rotor 2c has the ring-shaped portion 21b, when the temperature of the rotor 2c changes, even in the case where the first permanent magnet 21 or the second permanent magnet 22 deforms because of a difference in thermal shrinkage, it is possible to prevent detachment of the first permanent magnet 21 (especially the bodies 21a) from the second permanent magnet 22. In addition, a centrifugal force generated during rotation of the rotor 2c can prevent detachment of the first permanent magnet 21 (especially the bodies 21a) from the second permanent magnet 22.

Furthermore, since each ring-shaped portion 21b has at least one projection 21c to be engaged with the second permanent magnet 22, the first permanent magnet 21 can be firmly fixed to the second permanent magnet 22. Accordingly, detachment of the first permanent magnet 21 (especially the bodies 21a) from the second permanent magnet 22 can be effectively prevented.

Moreover, since each ring-shaped portion 21b has at least one recess 21d to be engaged with the second permanent magnet 22, the first permanent magnet 21 can be firmly fixed to the second permanent magnet 22. Accordingly, detachment of the first permanent magnet 21 (especially the bodies 21a) from the second permanent magnet 22 can be effectively prevented.

Fourth Variation

Figure 26:
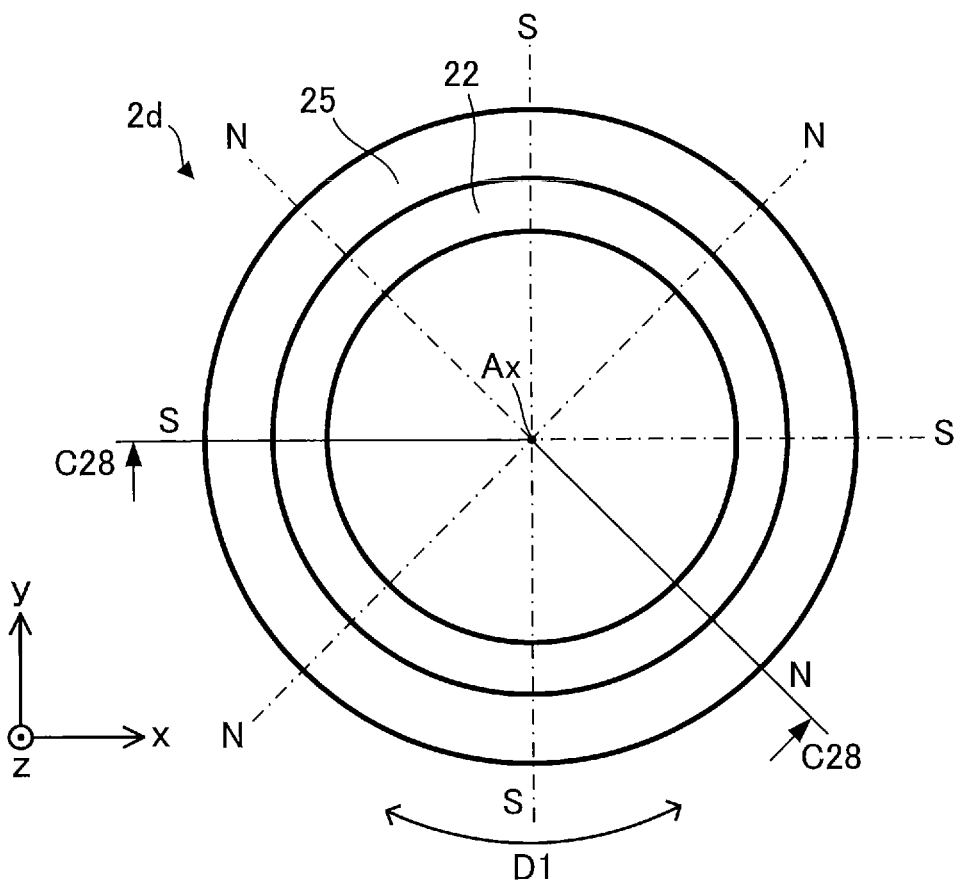
FIG. 26 is a plan view schematically illustrating a structure of a rotor according to a fourth variation.

FIG. 26 is a plan view schematically illustrating a structure of a rotor 2d according to a fourth variation.

Figure 27:
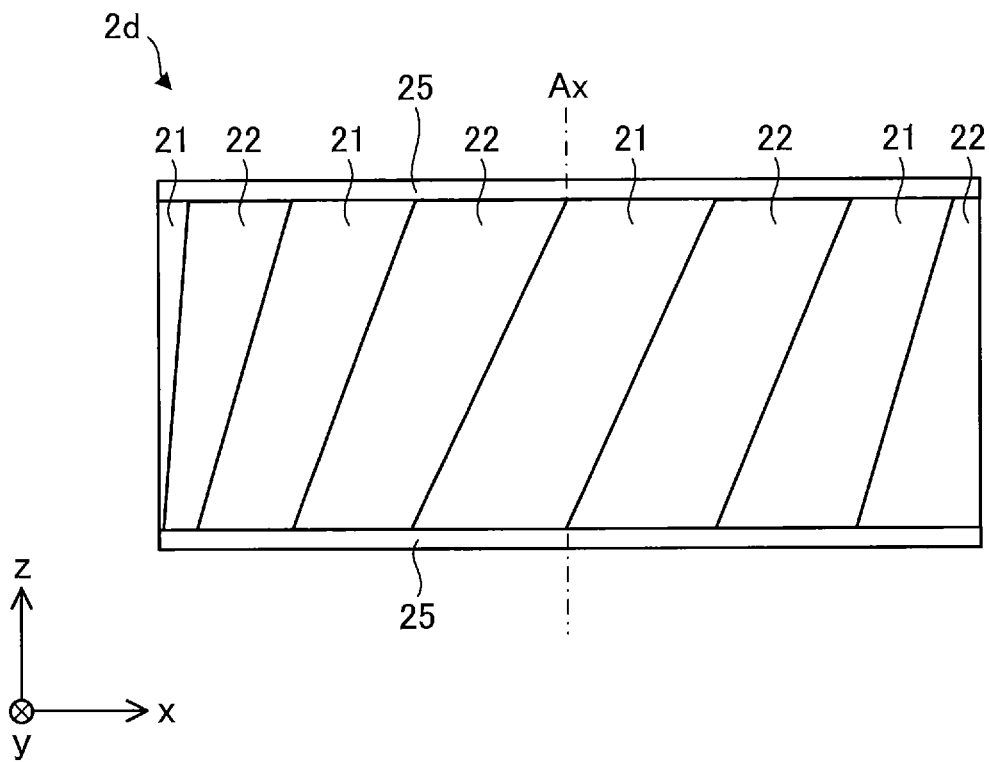
FIG. 27 is a side view schematically illustrating the structure of the rotor according to the fourth variation.

FIG. 27 is a side view schematically illustrating the structure of the rotor 2d according to the fourth variation.

Figure 28:
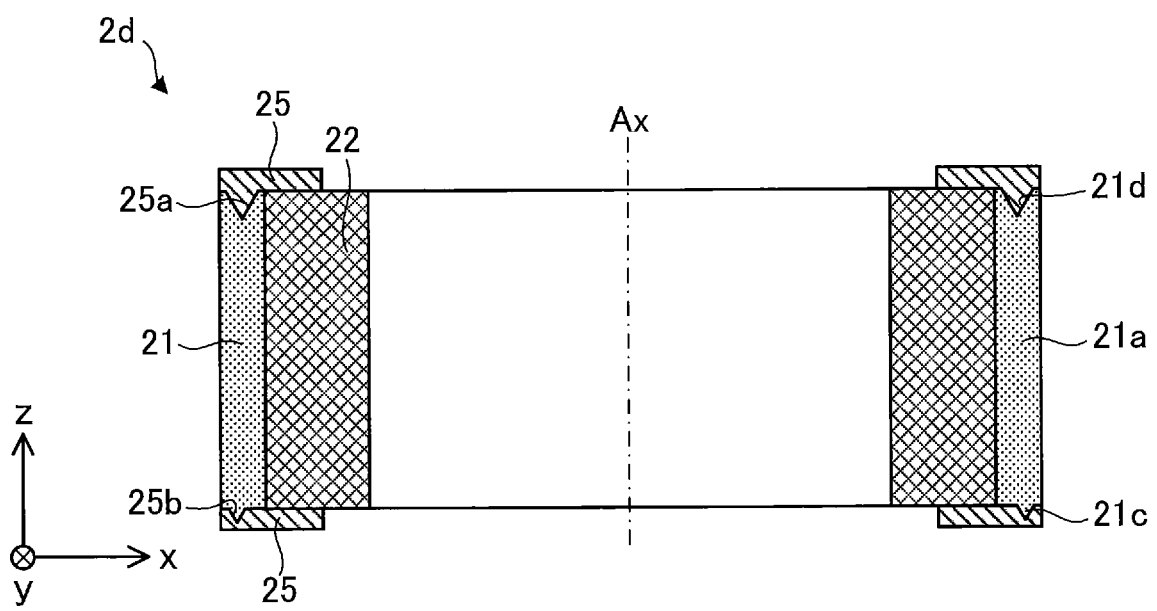
FIG. 28 is a cross-sectional view schematically illustrating the structure of the rotor according to the fourth variation.

FIG. 28 is a cross-sectional view schematically illustrating the structure of the rotor 2d according to the fourth variation. Specifically, FIG. 28 is a cross-sectional view taken along line C28-C28 in FIG. 26.

The rotor 2d according to the fourth variation further includes at least one resin 25. For example, the resin 25 can be molded integrally with a rib for fixing a shaft in the rotor 2d.

In the example illustrated in FIG. 27, the resin 25 is fixed to both ends of each first permanent magnet 21 in the axial direction of the rotor 2d. It should be noted that the resin 25 may be formed at one end of the first permanent magnet 21 in the axial direction of the rotor 2d. In the example illustrated in FIG. 26, each resin 25 is a ring-shaped resin in the xy plane. The resin 25 covers end portions of the first permanent magnet 21 in the axial direction of the rotor 2d.

As illustrated in FIG. 28, each resin 25 may include at least one projection 25a or at least one recess 25b. Each resin 25 may include both at least one projection 25a and at least one recess 25b. The projection 25a projects toward the second permanent magnet 22. For example, the projection 25a is engaged with a recess formed in the first permanent magnet 21 or the second permanent magnet 22. For example, the recess 25b is engaged with a projection formed on the first permanent magnet 21 or the second permanent magnet 22.

In general, when the temperature of a rotor changes, magnets deform in some cases. In such cases, one of two types of magnets might be detached from the rotor because of a difference in thermal shrinkage. In the fourth variation, since the rotor 2d includes the resin 25, when the temperature of the rotor 2d changes, even in the case where the first permanent magnet 21 or the second permanent magnet 22 deforms because of a difference in thermal shrinkage, it is possible to prevent detachment of the first permanent magnet 21 from the second permanent magnet 22. In addition, a centrifugal force generated during rotation of the rotor 2d can prevent detachment of the first permanent magnet 21 from the second permanent magnet 22.

Furthermore, since each resin 25 includes at least one projection 25a to be engaged with the first permanent magnet 21 or the second permanent magnet 22, each resin 25 can be firmly fixed to the first permanent magnet 21 or the second permanent magnet 22 with the resin 25 covering each first permanent magnet 21. Accordingly, detachment of the first permanent magnet 21 from the second permanent magnet 22 can be effectively prevented.

Furthermore, since each resin 25 includes at least one recess 25b to be engaged with the first permanent magnet 21 or the second permanent magnet 22, the resin 25 can be firmly fixed to the first permanent magnet 21 or the second permanent magnet 22 with the resin 25 covering each first permanent magnet 21. Accordingly, detachment of the first permanent magnet 21 from the second permanent magnet 22 can be effectively prevented.

Moreover, since the rotor 2d according to the fourth variation includes at least one resin 25, the amount of the first permanent magnet 21 can be reduced, as compared to the rotor 2c according to the third variation.

Fifth Variation

Figure 29:
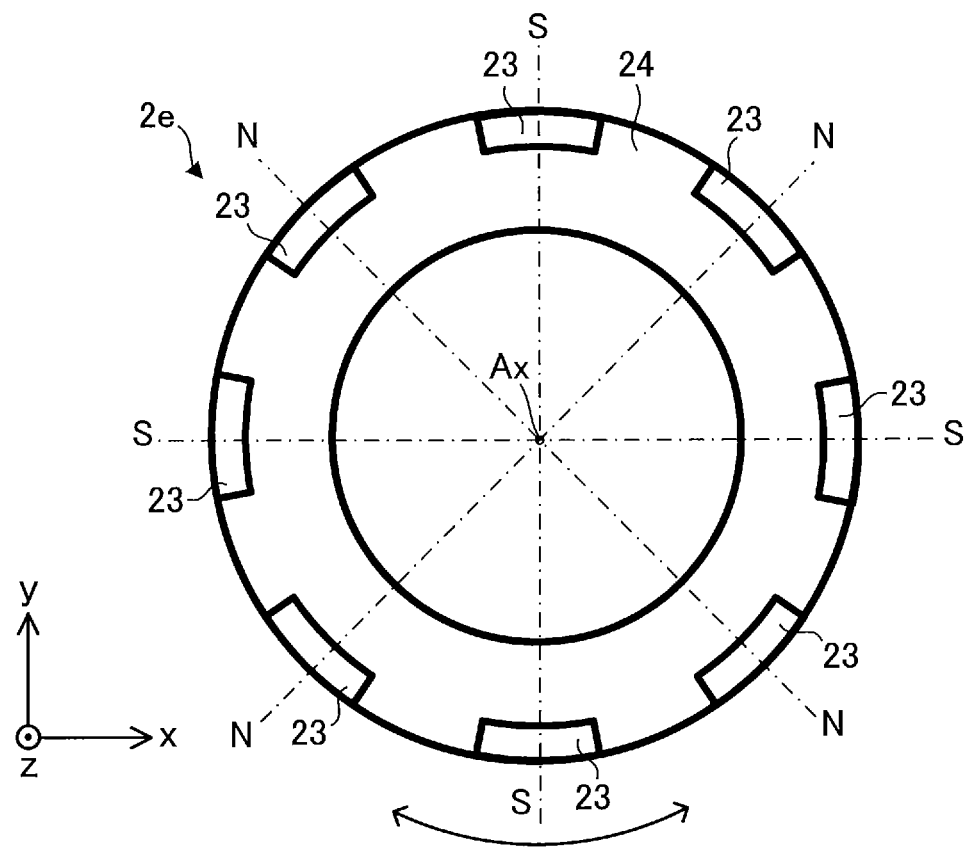
FIG. 29 is a plan view schematically illustrating a structure of a rotor according to a fifth variation.

FIG. 29 is a plan view schematically illustrating a structure of a rotor 2e according to a fifth variation.

Figure 30:
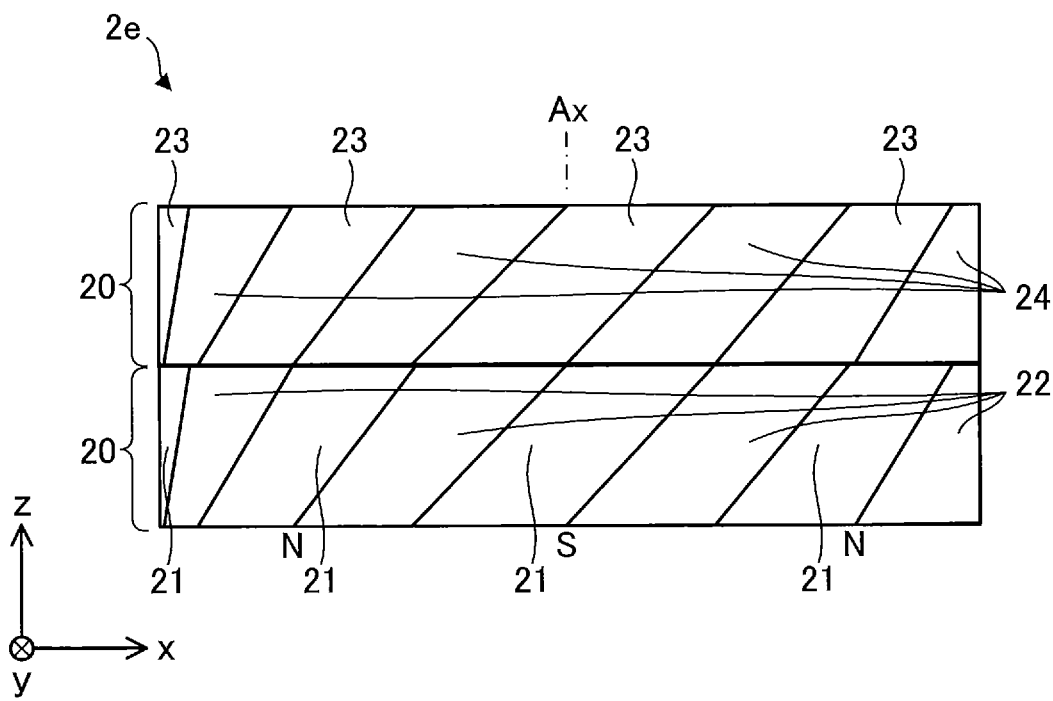
FIG. 30 is a side view schematically illustrating the structure of the rotor according to the fifth variation.

FIG. 30 is a side view schematically illustrating the structure of the rotor 2e according to the fifth variation.

The rotor 2e according to the fifth variation includes at least one first permanent magnet 21, one second permanent magnet 22, at least one third permanent magnet 23, and at least one fourth permanent magnet 24. In the example illustrated in FIG. 29, the structure of each third permanent magnet 23 is the same as the structure of the first permanent magnet 21, and the structure of each fourth permanent magnet 24 is the same as the structure of the second permanent magnet 22.

As illustrated in FIG. 30, the third permanent magnet 23 and the fourth permanent magnet 24 are stacked on the first permanent magnet 21 and the second permanent magnet 22 in the axial direction of the rotor 2e.

That is, each third permanent magnet 23 forms part of the outer peripheral surface of the rotor 2e, and is magnetized to have polar anisotropy. Each third permanent magnet 23 is, for example, a bonded magnet as a mixture of a rare earth magnet and a resin, that is, a rare earth bonded magnet. Each third permanent magnet 23 has higher magnetic force than that of the fourth permanent magnet 24. The rare earth magnet is, for example, a magnet containing neodymium (Nd)— iron (Fe)— boron (B) or a magnet containing samarium (Sm)— iron (Fe)— nitrogen (N). The resin is, for example, a nylon resin, a polyphenylene sulfide (PPS) resin, or an epoxy resin.

The fourth permanent magnet 24 is adjacent to the third permanent magnet 23 in the circumferential direction of the rotor 2e, and forms part of the outer peripheral surface of the rotor 2e. Specifically, part of the fourth permanent magnet 24 is adjacent to the third permanent magnet 23 in the circumferential direction of the rotor 2e, and another part of the fourth permanent magnet 24 is located on the inner side with respect to the third permanent magnet 23 in the radial direction of the rotor 2e. Thus, the fourth permanent magnet 24 is a ring-shaped magnet.

The fourth permanent magnet 24 is magnetized to have polar anisotropy. The fourth permanent magnet 24 is a magnet that is a different type from the third permanent magnet 23. Specifically, the fourth permanent magnet 24 is, for example, a bonded magnet as a mixture of a ferrite magnet and a resin, that is, a ferrite bonded magnet. The resin is, for example, a nylon resin, a polyphenylene sulfide (PPS) resin, or an epoxy resin. The fourth permanent magnet 24 has lower magnetic force than that of each third permanent magnet.

In the fifth variation, the rotor 2e includes two layers of magnets. In other words, the rotor 2e is divided into two layers. Specifically, the rotor 2e includes a first-layer layered magnet 20 constituted by the first permanent magnet 21 and the second permanent magnet 22, and a second-layer layered magnet 20 constituted by the third permanent magnet 23 and the fourth permanent magnet 24. Thus, since the rotor 2e includes the plurality of layers, an eddy-current loss in the rotor 2e can be reduced.

In the xy plane, a magnetic pole center position (e.g., a position of a north pole) of the first permanent magnet 21 preferably coincides with a magnetic pole center position (e.g., a position of a north pole) of the third permanent magnet 23. Accordingly, a magnetic flux density at each magnetic pole center position of the rotor 2e can be increased, and thus, the amount of magnetic flux flowing from the rotor 2e into the stator increases in an electric motor, and an output of the electric motor can be enhanced. Each magnetic pole center position of the first permanent magnet 21 and each magnetic pole center position of the third permanent magnet 23 are a position indicated by the broken line in FIG. 30.

The rotor 2e has 2n (n is a natural number) magnetic poles. In addition, the rotor 2e includes a plurality of layered magnets 20 from two to m (m is a natural number and a divisor for n) layers stacked in the axial direction. In the example illustrated in FIG. 30, n=4 and m=2. In each first permanent magnet 21 of the plurality of layered magnets 20, supposing one cycle is an angle between adjacent north poles in the xy plane, positions of north poles of two first permanent magnets 21 adjacent to each other in the axial direction may be shifted from each other by n/m cycles in the circumferential direction with respect to positions in orientation. In this case, positions of south poles of two first permanent magnets 21 adjacent to each other in the axial direction are also shifted from each other by n/m cycles in the circumferential direction. Accordingly, even in the case where the layered magnets 20 have variations in orientation, variations of magnetic flux density are reduced in the circumferential direction in the entire rotor 2e, and distortion of an induced voltage is reduced and consequently vibrations and noise in the electric motor can be thereby reduced.

Sixth Variation

Figure 31:
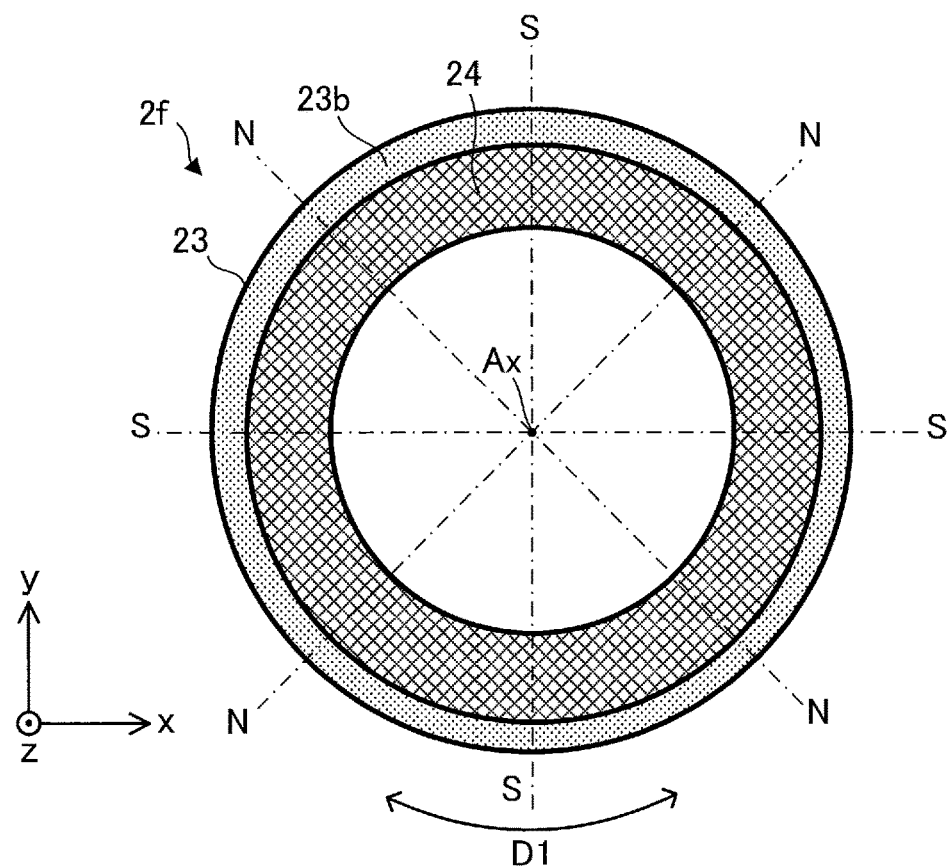
FIG. 31 is a cross-sectional view schematically illustrating a structure of a rotor according to a sixth variation.

FIG. 31 is a cross-sectional view schematically illustrating a structure of a rotor 2f according to a sixth variation. Specifically, FIG. 31 is a cross-sectional view taken along line C31-C31 in FIG. 32.

Figure 32:
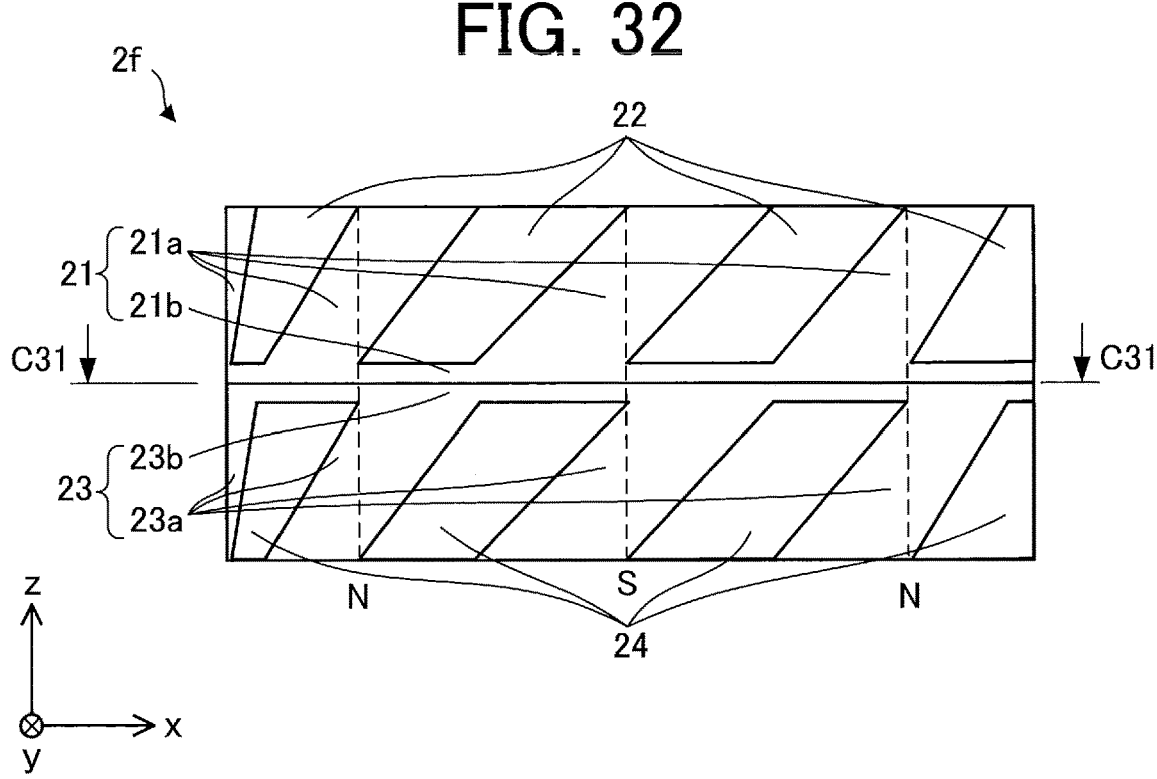
FIG. 32 is a side view schematically illustrating the structure of the rotor according to the sixth variation.

FIG. 32 is a side view schematically illustrating the structure of the rotor 2f according to the sixth variation.

The rotor 2f according to the sixth variation includes at least one first permanent magnet 21, one second permanent magnet 22, at least one third permanent magnet 23, and at least one fourth permanent magnet 24. In the example illustrated in FIG. 32, the structure of each third permanent magnet 23 is the same as the structure of the first permanent magnet 21, and the structure of each fourth permanent magnet 24 is the same as the structure of the second permanent magnet 22.

The third permanent magnet 23 may be integral, or may be divided into a plurality of parts. The fourth permanent magnet 24 may be integral, or may be divided into a plurality of parts.

As illustrated in FIG. 32, the third permanent magnet 23 and the fourth permanent magnet 24 are stacked on the first permanent magnet 21 and the second permanent magnet 22 in the axial direction of the rotor 2f.

That is, each third permanent magnet 23 forms part of the outer peripheral surface of the rotor 2f, and is magnetized to have polar anisotropy. Each third permanent magnet 23 is, for example, a bonded magnet as a mixture of a rare earth magnet and a resin, that is, a rare earth bonded magnet. Each third permanent magnet 23 has higher magnetic force than that of the fourth permanent magnet 24. The rare earth magnet is, for example, a magnet containing neodymium (Nd)— iron (Fe)— boron (B) or a magnet containing samarium (Sm)— iron (Fe)— nitrogen (N). The resin is, for example, a nylon resin, a polyphenylene sulfide (PPS) resin, or an epoxy resin.

The fourth permanent magnet 24 is adjacent to the third permanent magnet 23 in the circumferential direction of the rotor 2f, and forms part of the outer peripheral surface of the rotor 2f. Specifically, part of the fourth permanent magnet 24 is adjacent to the third permanent magnet 23 in the circumferential direction of the rotor 2f, and another part of the fourth permanent magnet 24 is located on the inner side with respect to the third permanent magnet 23 in the radial direction of the rotor 2f. Thus, the fourth permanent magnet 24 is a ring-shaped magnet.

The fourth permanent magnet 24 is magnetized to have polar anisotropy. The fourth permanent magnet 24 is a magnet that is a different type from the third permanent magnet 23. Specifically, the fourth permanent magnet 24 is, for example, a bonded magnet as a mixture of a ferrite magnet and a resin, that is, a ferrite bonded magnet. The resin is, for example, a nylon resin, a polyphenylene sulfide (PPS) resin, or an epoxy resin. The fourth permanent magnet 24 has lower magnetic force than that of each third permanent magnet.

In the rotor 2f according to the sixth variation, the first permanent magnet 21 is integral. The first permanent magnet 21 includes a plurality of bodies 21a and at least one ring-shaped portion 21b (also referred to as a first ring-shaped portion in the sixth variation). The plurality of bodies 21a correspond to the first permanent magnets 21 in the first embodiment (the first permanent magnets 21 illustrated in FIG. 1). Thus, each of the bodies 21a forms part of the outer peripheral surface of the rotor 2f and is magnetized to have polar anisotropy. Part of the second permanent magnet 22 is present between two bodies 21a adjacent to each other in the circumferential direction.

The ring-shaped portion 21b is integrated with the plurality of bodies 21a. Thus, in the sixth variation, the rotor 2f includes one first permanent magnet 21 and one second permanent magnet 22. In the example illustrated in FIG. 32, the ring-shaped portion 21b is formed at an end portion of the first permanent magnet 21 in the axial direction. The ring-shaped portion 21b covers an end portion of the second permanent magnet 22 in the axial direction of the rotor 2f.

In the rotor 2f according to the sixth variation, the third permanent magnet 23 is integral. The third permanent magnet 23 includes a plurality of bodies 23a, at least one ring-shaped portion 23b (also referred to as a second ring-shaped portion in the sixth variation). The plurality of bodies 23a correspond to the first permanent magnets 21 in the first embodiment (the first permanent magnets 21 illustrated in FIG. 1). Thus, each of the bodies 23a forms part of the outer peripheral surface of the rotor 2f and is magnetized to have polar anisotropy. Part of the fourth permanent magnet 24 is present between two bodies 23a adjacent to each other in the circumferential direction.

The ring-shaped portion 23b is integrated with the plurality of bodies 23a. Thus, in the sixth variation, the rotor 2f includes one third permanent magnet 23 and one fourth permanent magnet 24. In the example illustrated in FIG. 32, the ring-shaped portion 23b is formed at an end portion of the third permanent magnet 23 in the axial direction. The ring-shaped portion 23b covers an end portion of the fourth permanent magnet 24 in the axial direction of the rotor 2f.

In the axial direction of the rotor 2f, the ring-shaped portion 21b faces the ring-shaped portion 23b. Accordingly, the proportion of the first permanent magnet 21 and the third permanent magnet 23 can be increased in a center portion of the rotor 2f in the axial direction. As a result, in an electric motor, the amount of magnetic flux flowing from the rotor 2f into a stator increases and thus an output of the electric motor can be thereby increased.

In the electric motor, the length of the rotor 2f in the axial direction is preferably larger than the length of the stator in the axial direction. Accordingly, leakage of magnetic flux from the rotor 2f can be reduced. Specifically, in an electric motor, the amount of magnetic flux flowing from the rotor 2f into a stator increases and thus an output of the electric motor can be increased.

In the sixth variation, the rotor 2f includes two layers of magnets. In other words, the rotor 2f is divided into two layers. Specifically, the rotor 2f includes a first layer constituted by the first permanent magnet 21 and the second permanent magnet 22, and a second layer constituted by the third permanent magnet 23 and the fourth permanent magnet 24. Thus, since the rotor 2f includes the plurality of layers, an eddy-current loss in the rotor 2f can be reduced.

In the xy plane, a magnetic pole center position (e.g., a position of a north pole) of the first permanent magnet 21 preferably coincides with a magnetic pole center position (e.g., a position of a north pole) of the third permanent magnet 23. Accordingly, a magnetic flux density at each magnetic pole center position of the rotor 2f can be increased, and thus, the amount of magnetic flux flowing from the rotor 2f into the stator in the electric motor increases, and an output of the electric motor can be enhanced. Each magnetic pole center position of the first permanent magnet 21 and each magnetic pole center position of the third permanent magnet 23 are a position indicated by the broken line in FIG. 32.

Seventh Variation

Figure 33:
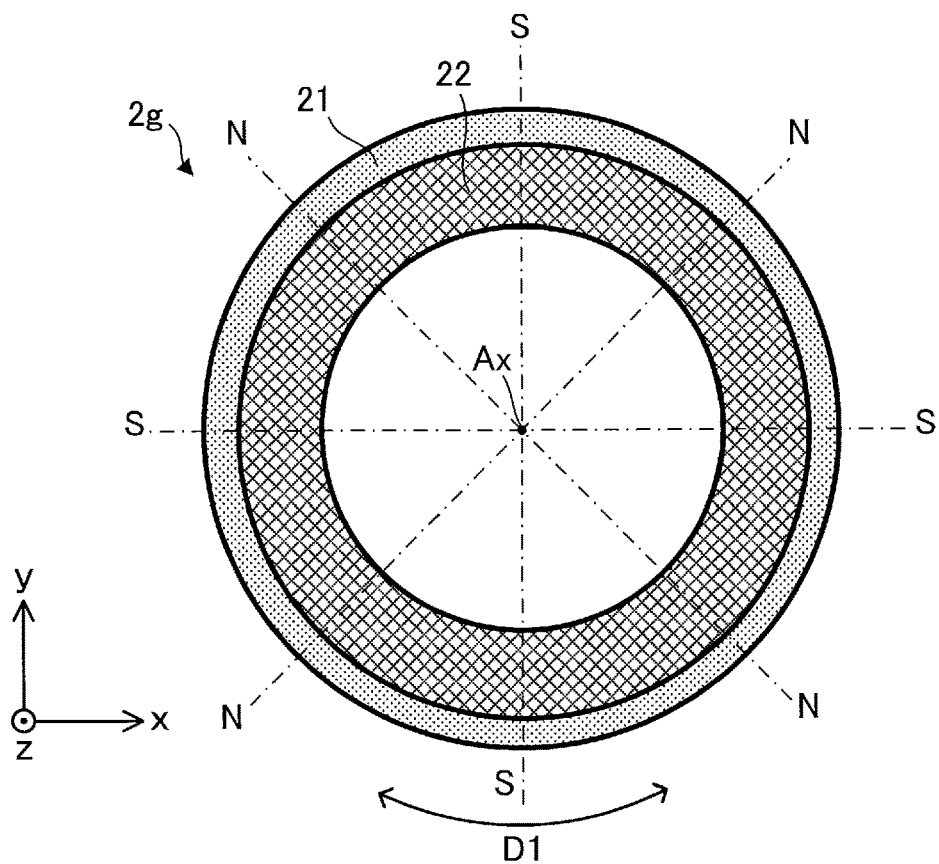
FIG. 33 is a cross-sectional view schematically illustrating a structure of a rotor according to a seventh variation.

FIG. 33 is a cross-sectional view schematically illustrating a structure of a rotor 2g according to a seventh variation. FIG. 33 is a cross-sectional view taken along line C33-C33 in FIG. 34.

Figure 34:
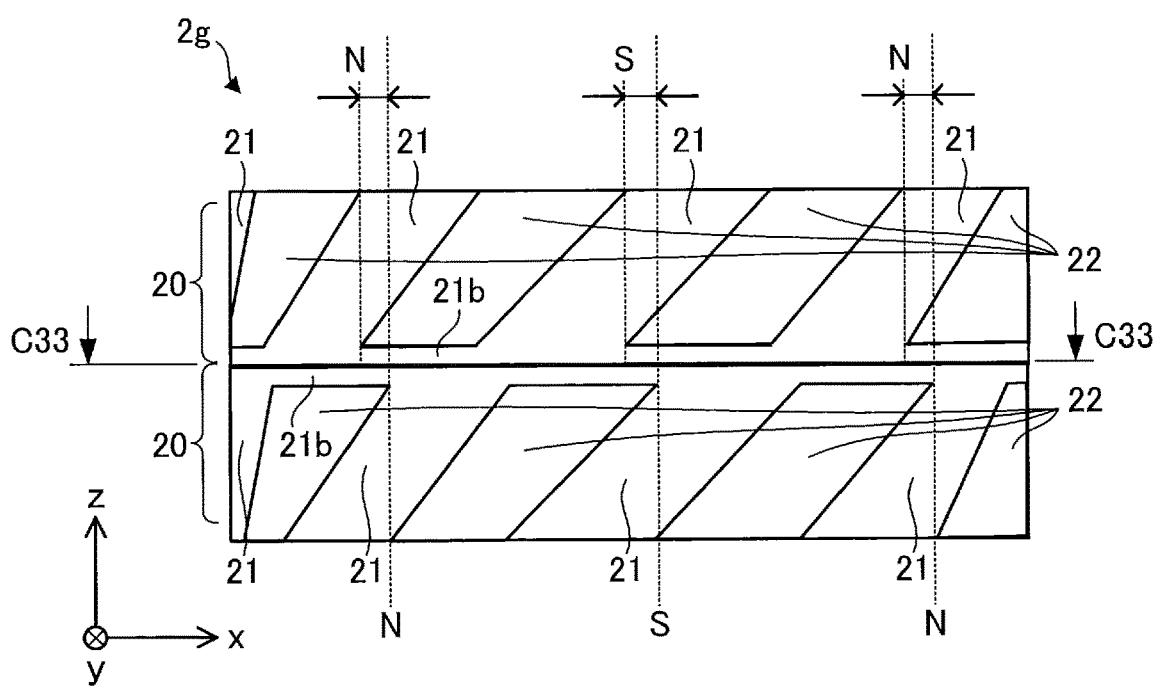
FIG. 34 is a side view schematically illustrating the structure of the rotor according to the seventh variation.

FIG. 34 is a side view schematically illustrating the structure of the rotor 2g according to the seventh variation.

The rotor 2g according to the seventh variation has 2n (n is a natural number) magnetic poles, as in the first embodiment and the variations thereof described above. In addition, the rotor 2g includes a plurality of layered magnets 20 from two to m (m is a natural number and a divisor for n) layers stacked in the axial direction. In the example illustrated in FIG. 34, n=4 and m=2. That is, in the example illustrated in FIG. 34, the rotor 2g includes two layers of layered magnets 20.

Each layered magnet 20 of the plurality of layered magnets 20 includes at least one first permanent magnet 21 and one second permanent magnet 22.

As illustrated in FIG. 34, the plurality of layered magnets 20 are stacked in the axial direction of the rotor 2g. As described above, the rotor 2g includes two layers of magnets. In other words, the rotor 2g is divided into two layers. Thus, since the rotor 2g includes the plurality of layers, an eddy-current loss in the rotor 2g can be reduced.

In the axial direction of the rotor 2g, a ring-shaped portion 21b of each first permanent magnet 21 faces a ring-shaped portion 21b of another first permanent magnet 21. Accordingly, a proportion of the first permanent magnets 21 can be increased in a center portion of the rotor 2g in the axial direction. As a result, in an electric motor, the amount of magnetic flux flowing from the rotor 2g into a stator increases and thus an output of the electric motor can be increased.

In each first permanent magnet 21 of the plurality of layered magnets 20, supposing one cycle is an angle between adjacent north poles in the xy plane, positions of north poles of two first permanent magnets 21 adjacent to each other in the axial direction are shifted from each other by n/m cycles in the circumferential direction. Positions of south poles of two first permanent magnets 21 adjacent to each other in the axial direction are also shifted from each other by n/m cycles in the circumferential direction. Accordingly, even in the case where the layered magnets 20 have variations in orientation, a uniform orientation in the rotor 2g can be obtained. As a result, in a manner similar to the example illustrated in FIG. 13, in the entire rotor 2g, an abrupt change of the flux density in the circumferential direction can be suppressed, and vibrations and noise in an electric motor can be reduced.

Eighth Variation

Figure 35:
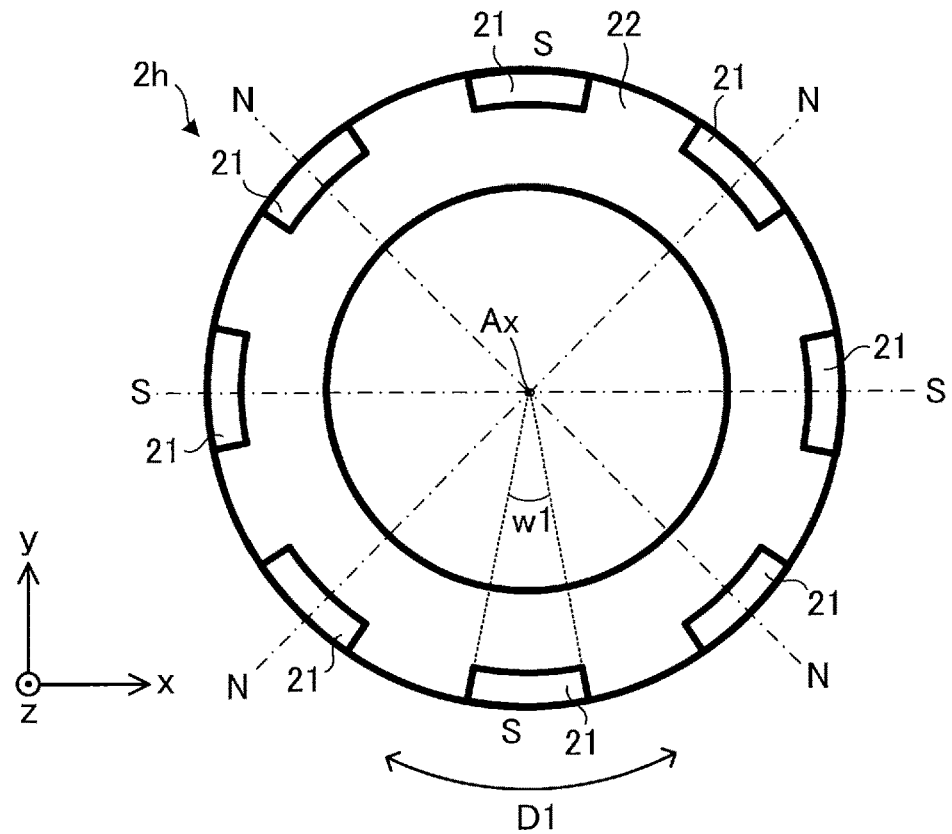
FIG. 35 is a plan view schematically illustrating a structure of a rotor according to an eighth variation.

FIG. 35 is a plan view schematically illustrating a structure of a rotor 2h according to an eighth variation.

Figure 36:
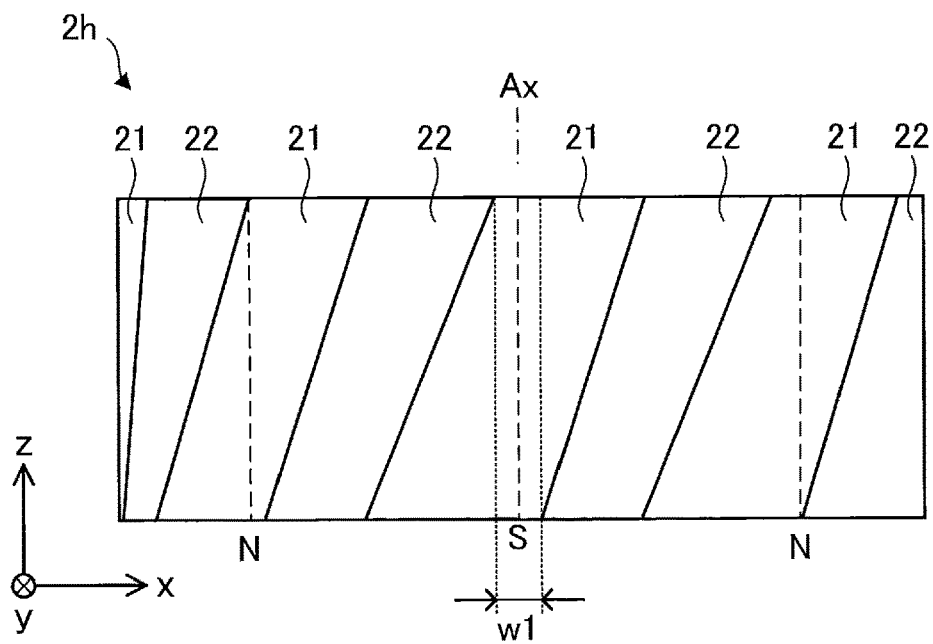
FIG. 36 is a side view schematically illustrating the structure of the rotor according to the eighth variation.

FIG. 36 is a side view schematically illustrating the structure of the rotor 2h according to the eighth variation.

In the rotor 2h according to the eighth variation, a structure of first permanent magnets 21 of the rotor 2h is different from the structure of the first permanent magnets 21 of the rotor 2 according to the first embodiment. Specifically, as illustrated in FIGS. 35 and 36, both ends of the first permanent magnets 21 in the axial direction overlap each other by an angle w1 [degrees] in an xy plane. In this case, the angle w1 satisfies 0<w1<0.2×2n/360. In a manner similar to the first embodiment, the rotor 2h has 2n (n is a natural number) magnetic poles. In the eighth variation, n is 4.

Accordingly, the volume of the first permanent magnet 21 near a magnetic pole center part of the rotor 2h can be increased. In other words, a proportion of the first permanent magnets 21 near the magnetic pole center part of the rotor 2h can be increased. As a result, magnetic force of the rotor 2h can be increased and thus efficiency of an electric motor including the rotor 2h can be enhanced.

Ninth Variation

Figure 37:
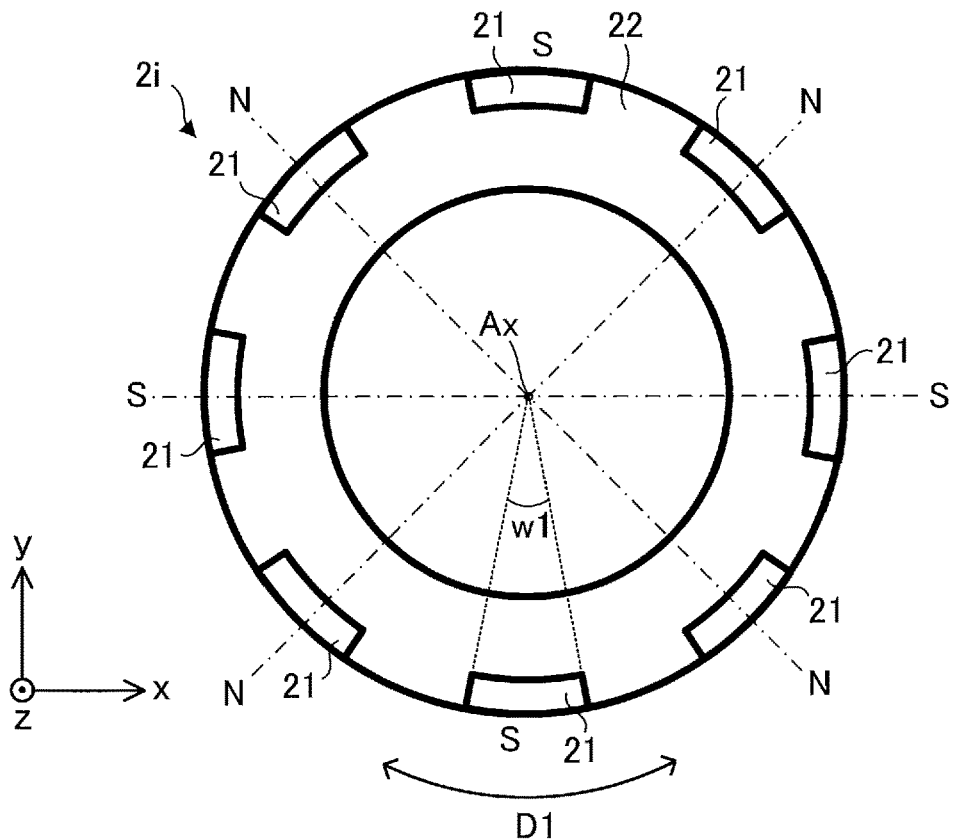
FIG. 37 is a plan view schematically illustrating a structure of a rotor according to a ninth variation.

FIG. 37 is a plan view schematically illustrating a structure of a rotor 2i according to a ninth variation.

Figure 38:
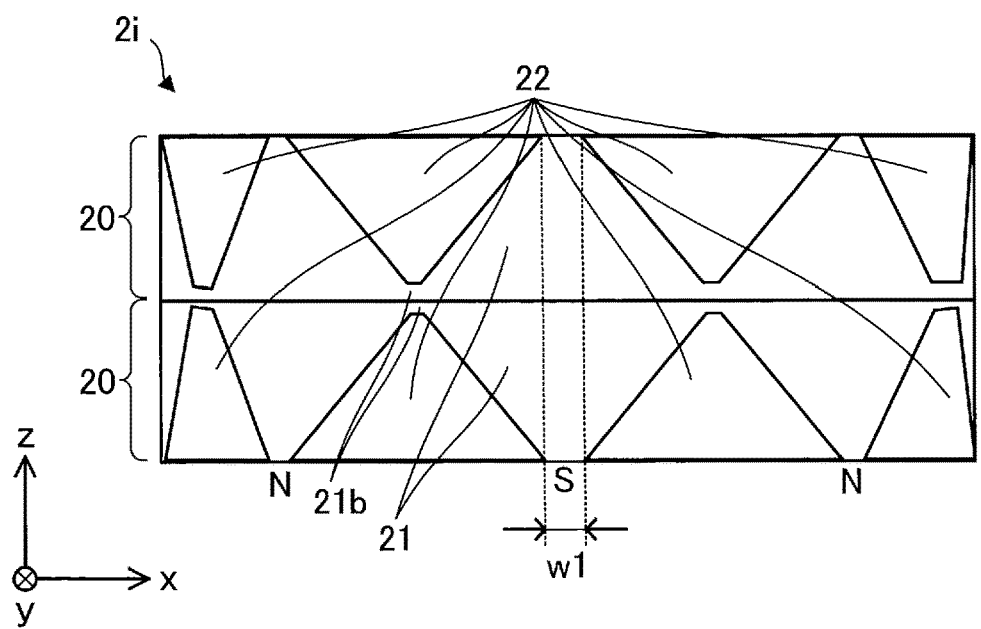
FIG. 38 is a side view schematically illustrating the structure of the rotor according to the ninth variation.

FIG. 38 is a side view schematically illustrating the structure of the rotor 2i according to the ninth variation.

In the rotor 2i according to the ninth variation, a structure of first permanent magnets 21 of the rotor 2i is different from the structure of the first permanent magnets 21 of the rotor 2 according to the first embodiment. Specifically, as illustrated in FIGS. 37 and 38, both ends of the first permanent magnets 21 in the axial direction overlap each other by an angle w1 [degrees] in an xy plane. In this case, the angle w1 satisfies 0<w1<0.2×2n/360. In a manner similar to the first embodiment, the rotor 2i has 2n (n is a natural number) magnetic poles. In the ninth variation, n is 4.

Accordingly, the volume of the first permanent magnets 21 near a magnetic pole center part of the rotor 2i can be increased. In other words, a proportion of the first permanent magnets 21 near the magnetic pole center part of the rotor 21 can be increased. As a result, magnetic force of the rotor 2i can be increased and thus efficiency of an electric motor including the rotor 2i can be enhanced.

The rotor 2i includes a plurality of layered magnets 20 from two to m (m is a natural number and a divisor for n) layers stacked in the axial direction. In the example illustrated in FIG. 38, n=4 and m=2. That is, in the example illustrated in FIG. 38, the rotor 2i includes two layers of layered magnets 20.

Each layered magnet 20 of the plurality of layered magnets 20 includes at least one first permanent magnet 21 and one second permanent magnet 22.

As illustrated in FIG. 38, the plurality of layered magnets 20 are stacked in the axial direction of the rotor 2i. As described above, the rotor 2i includes two layers of magnets. In other words, the rotor 2i is divided into two layers. Thus, since the rotor 2i includes the plurality of layers, an eddy-current loss in the rotor 2i can be reduced.

In the axial direction of the rotor 2i, a ring-shaped portion 21b of each first permanent magnet 21 faces a ring-shaped portion 21b of another first permanent magnet 21. Accordingly, a proportion of the first permanent magnets 21 can be increased in a center portion of the rotor 2i in the axial direction. As a result, in an electric motor, the amount of magnetic flux flowing from the rotor 2i into the stator can be increased.

In each first permanent magnet 21 of the plurality of layered magnets 20, supposing one cycle is an angle between adjacent north poles in an xy plane, positions of north poles of two first permanent magnets 21 adjacent to each other in the axial direction are shifted from each other by n/m cycles in the circumferential direction. Positions of south poles of two first permanent magnets 21 adjacent to each other in the axial direction are also shifted from each other by n/m cycles in the circumferential direction. Accordingly, even in the case where the layered magnets 20 have variations in orientation, a uniform orientation in the rotor 2i can be obtained. As a result, in a manner similar to the example illustrated in FIG. 13, in the entire rotor 2i, an abrupt change of the flux density in the circumferential direction can be suppressed, and vibrations and noise in an electric motor can be reduced.

Tenth Variation

Figure 39:
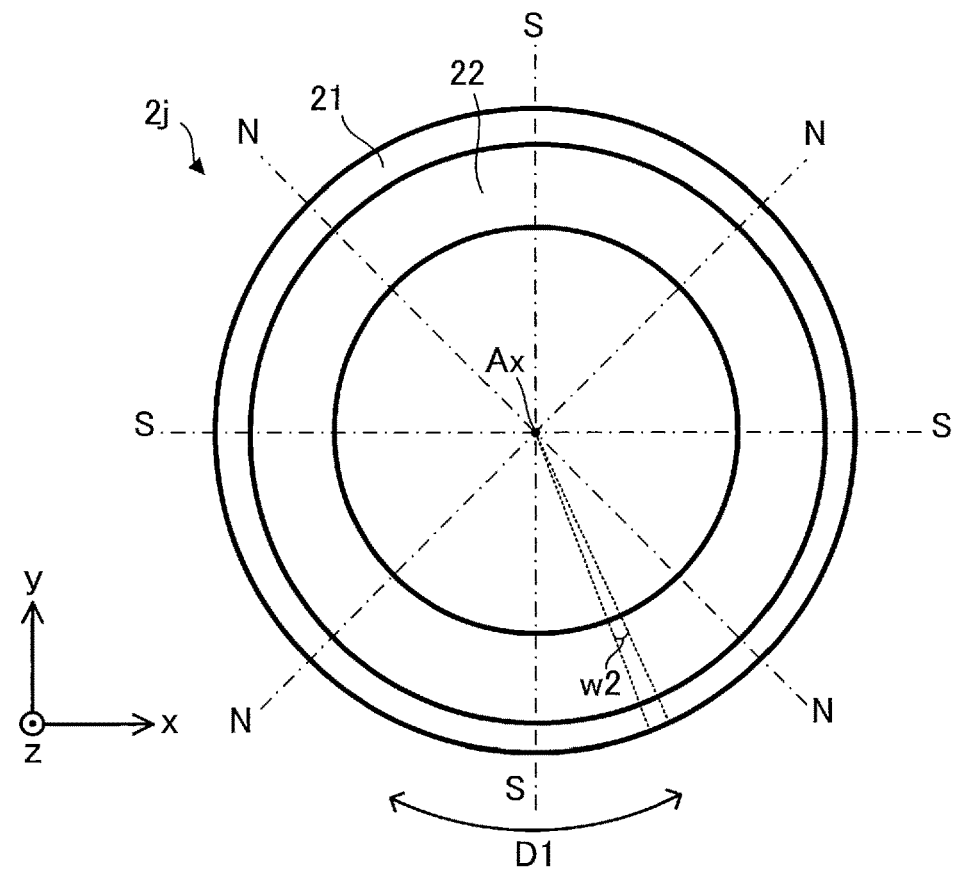
FIG. 39 is a plan view schematically illustrating a structure of a rotor according to a tenth variation.

FIG. 39 is a plan view schematically illustrating a structure of a rotor 2j according to a tenth variation.

Figure 40:
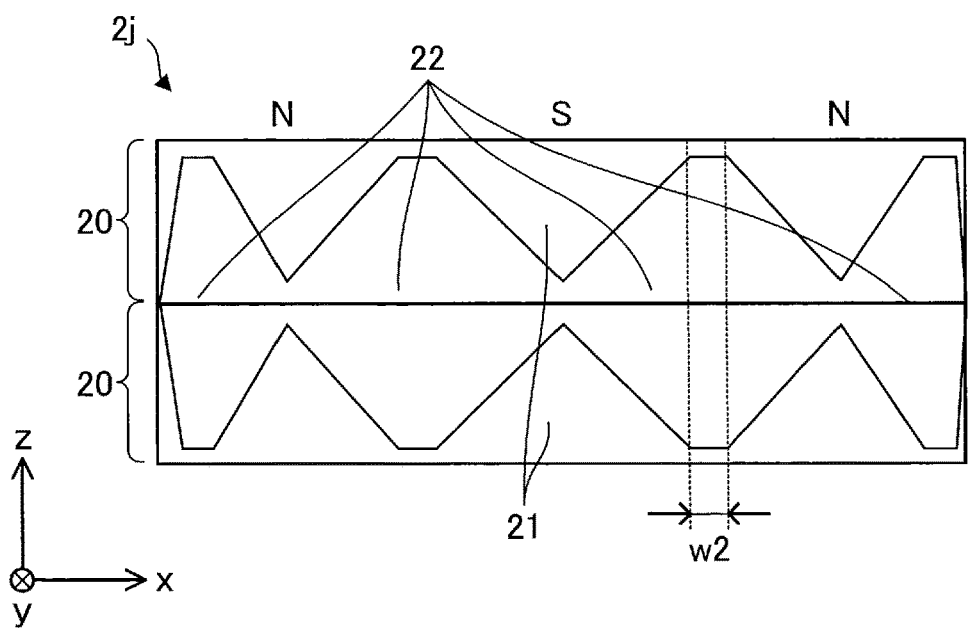
FIG. 40 is a side view schematically illustrating the structure of the rotor according to the tenth variation.

FIG. 40 is a side view schematically illustrating the structure of the rotor 2j according to the tenth variation.

In the rotor 2j according to the tenth variation, a structure of first permanent magnets 21 of the rotor 2j is different from the structure of the first permanent magnets 21 of the rotor 2 according to the first embodiment. Specifically, as illustrated in FIGS. 39 and 40, in an xy plane, both ends of the first permanent magnets 21 in the axial direction overlap each other by an angle w2 [degrees] in an inter-pole part of the rotor 2j. In this case, the angle w2 satisfies 0<w2<0.2× 2n/360. In a manner similar to the first embodiment, the rotor has 2n (n is a natural number) magnetic poles. In the tenth variation, n is 4.

Accordingly, a magnetic flux density distribution obtained in the entire rotor 2j can be made as a more uniform sine wave. Accordingly, a proportion of a harmonic component in the induced voltage can be reduced and thus distortion of the induced voltage thereby decreases. As a result, during driving of an electric motor, pulsations of a torque of the electric motor decreases and consequently vibrations and noise in the electric motor can be reduced.

The rotor 2j includes a plurality of layered magnets 20 from two to m (m is a natural number and a divisor for n) layers stacked in the axial direction. In the example illustrated in FIG. 40, n=4 and m=2. That is, in the example illustrated in FIG. 40, the rotor 2j includes two layers of layered magnets 20.

Each layered magnet 20 of the plurality of layered magnets 20 includes at least one first permanent magnet 21 and one second permanent magnet 22.

As illustrated in FIG. 40, the plurality of layered magnets 20 are stacked in the axial direction of the rotor 2j. As described above, the rotor 2j includes two layers of magnets. In other words, the rotor 2j is divided into two layers. Thus, since the rotor 2j includes the plurality of layers, an eddy-current loss in the rotor 2j can be reduced.

In each first permanent magnet 21 of the plurality of layered magnets 20, supposing one cycle is an angle between adjacent north poles in an xy plane, positions of north poles of two first permanent magnets 21 adjacent to each other in the axial direction are shifted from each other by n/m cycles in the circumferential direction. Positions of south poles of two first permanent magnets 21 adjacent to each other in the axial direction are also shifted from each other by n/m cycles in the circumferential direction. Accordingly, even in the case where the layered magnets 20 have variations in orientation, a uniform orientation can be obtained in the rotor 2j. As a result, in a manner similar to the example illustrated in FIG. 13, an abrupt change of the flux density in the circumferential direction can be suppressed in the entire rotor 2j, and vibrations and noise in an electric motor can be reduced.

The rotors 2a through 2j according to the variations described above also have the advantages of the rotor 2 according to the first embodiment.

Second Embodiment

Figure 41:
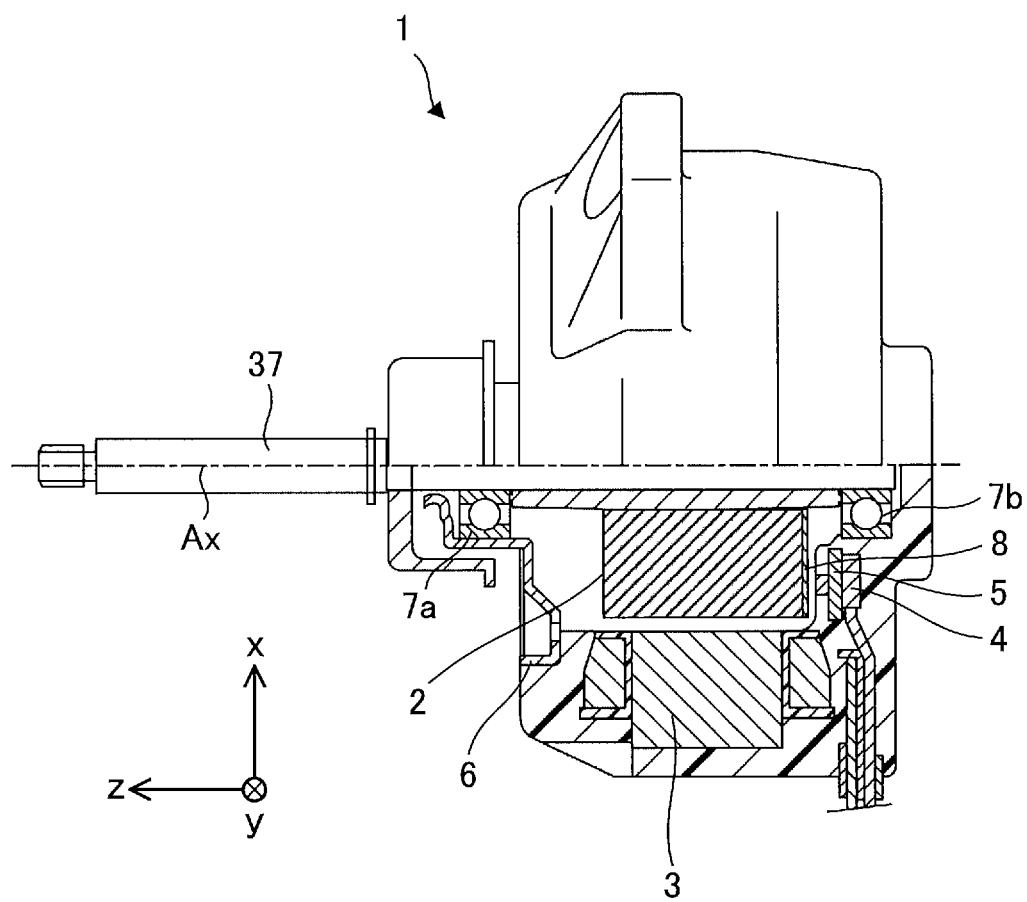
FIG. 41 is a partial cross-sectional view schematically illustrating a structure of an electric motor according to a second embodiment of the present invention.

FIG. 41 is a partial cross-sectional view schematically illustrating a structure of an electric motor 1 according to a second embodiment of the present invention.

The electric motor 1 includes the rotor 2 according to the first embodiment, and a stator 3. Instead of the rotor 2, the rotors 2a through 2j according to the variations of the first embodiment are applicable to the electric motor 1.

The electric motor 1 includes the rotor 2, the stator 3, a circuit board 4, a magnetic sensor 5 for detecting a rotation position of the rotor 2, a bracket 6, bearings 7a and 7b, a sensor magnet 8 as a magnet for detecting a rotation position of the rotor 2, and a shaft 37 fixed to the rotor 2. The electric motor 1 is, for example, a permanent magnet synchronous motor.

The rotor 2 is rotatably disposed at the inner side of the stator 3. An air gap is formed between the rotor 2 and the stator 3. The rotor 2 rotates about an axis Ax.

Since the electric motor 1 according to the second embodiment includes the rotor 2 according to the first embodiment (including the variations thereof), the same advantages as those of the rotor 2 described in the first embodiment (including advantages of the variations thereof).

The electric motor 1 according to the second embodiment includes the rotor 2 according to the first embodiment, and thus, efficiency of the electric motor 1 can be increased.

Third Embodiment

Figure 42:
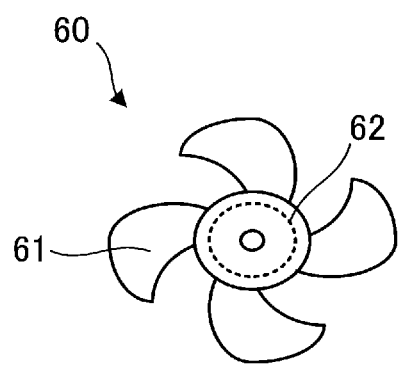
FIG. 42 is a diagram schematically illustrating a structure of a fan according to a third embodiment of the present invention.

FIG. 42 is a diagram schematically illustrating a structure of a fan 60 according to a third embodiment of the present invention.

The fan 60 includes a blade 61 and an electric motor 62. The fan 60 is also called an air blower. The electric motor 62 is the electric motor 1 according to the second embodiment. The blade 61 is fixed to a shaft of the electric motor 62. The electric motor 62 drives the blade 61. When the electric motor 62 is driven, the blade 61 rotates to generate an airflow. In this manner, the fan 60 is capable of supplying air.

In the fan 60 according to the third embodiment, the electric motor 1 described in the second embodiment is applied to the electric motor 62, and thus, the same advantages as those described in the second embodiment can be obtained. In addition, efficiency of the fan 60 can be enhanced.

Fourth Embodiment

An air conditioner 50 (also referred to as a refrigeration air conditioning apparatus or a refrigeration cycle apparatus) according to a fourth embodiment of the present invention will be described.

Figure 43:
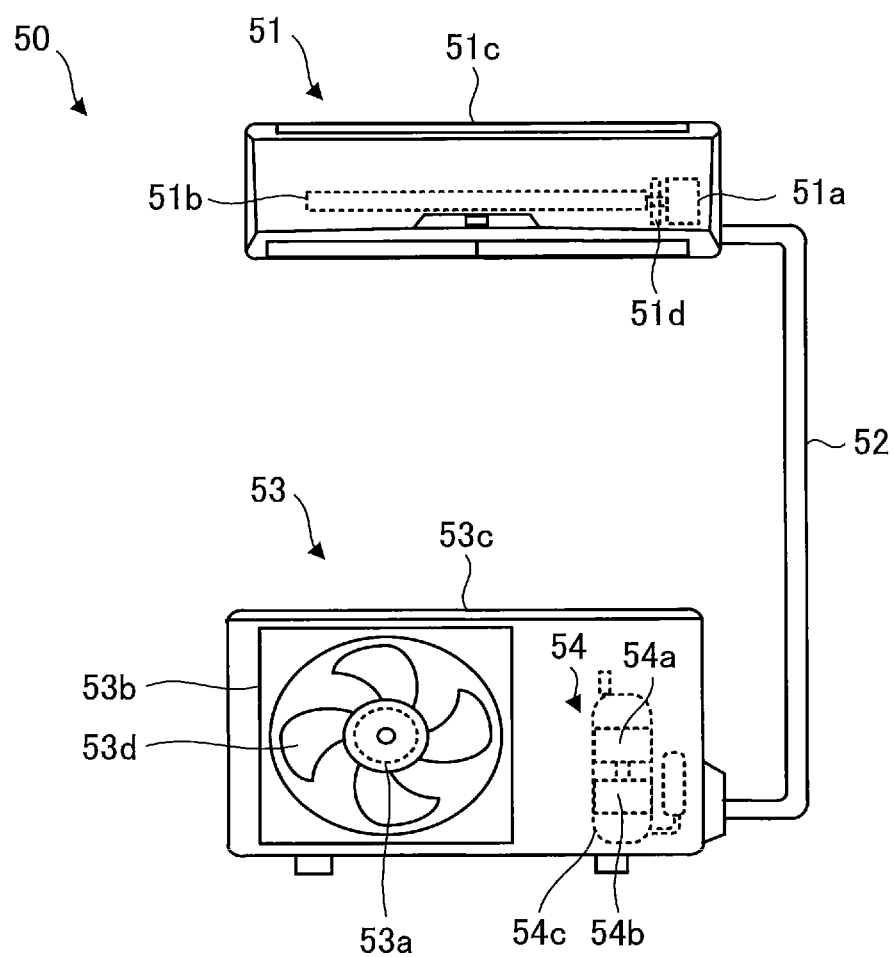
FIG. 43 is a diagram schematically illustrating a configuration of an air conditioner according to a fourth embodiment of the present invention.

FIG. 43 is a diagram schematically illustrating a configuration of the air conditioner 50 according to the fourth embodiment.

The air conditioner 50 according to the fourth embodiment includes an indoor unit 51 as an air blower (first air blower), a refrigerant pipe 52, and an outdoor unit 53 as an air blower (second air blower) connected to the indoor unit 51 through the refrigerant pipe 52.

The indoor unit 51 includes an electric motor 51a (e.g., the electric motor 1 according to the second embodiment), an air blowing unit 51b that supplies air when being driven by the electric motor 51a, and a housing 51c covering the electric motor 51a and the air blowing unit 51b. The air blowing unit 51b includes, for example, a blade 51d that is driven by the electric motor 51a. For example, the blade 51d is fixed to a shaft of the electric motor 51a, and generates an airflow.

The outdoor unit 53 includes an electric motor 53a (e.g., the electric motor 1 according to the second embodiment), an air blowing unit 53b, a compressor 54, and a heat exchanger (not shown). When the air blowing unit 53b is driven by the electric motor 53a, the air blowing unit 53b supplies air. The air blowing unit 53b includes, for example, a blade 53d that is driven by the electric motor 53a. For example, the blade 53d is fixed to a shaft of the electric motor 53a, and generates an airflow. The compressor 54 includes an electric motor 54a (e.g., the electric motor 1 according to the second embodiment), a compression mechanism 54b (e.g., a refrigerant circuit) that is driven by the electric motor 54a, and a housing 54c covering the electric motor 54a and the compression mechanism 54b.

In the air conditioner 50, at least one of the indoor unit 51 or the outdoor unit 53 includes the electric motor 1 described in the second embodiment. Specifically, as a driving source of an air blowing unit, the electric motor 1 described in the second embodiment is applied to at least one of the electric motors 51a or 53a. In addition, as the electric motor 54a of the compressor 54, the electric motor 1 described in the second embodiment may be used.

The air conditioner 50 is capable of performing a cooling operation of sending cold air from the indoor unit 51, and a heating operation of sending hot air, for example. In the indoor unit 51, the electric motor 51a is a driving source for driving the air blowing unit 51b. The air blowing unit 51b is capable of supplying conditioned air.

In the air conditioner 50 according to the fourth embodiment, the electric motor 1 described in the second embodiment is applied to at least one of the electric motors 51a or 53a, and thus, the same advantages as those described in the second embodiment can be obtained. In addition, efficiency of the air conditioner 50 can be enhanced.

Furthermore, with the use of the electric motor 1 according to the second embodiment as a driving source of an air blower (e.g., the indoor unit 51), the same advantages as those described in the second embodiment can be obtained. Accordingly, efficiency of the air blower can be enhanced. The air blower including the electric motor 1 according to the second embodiment and the blade (e.g., the blade 51d or 53d) driven by the electric motor 1 can be used alone as a device for supplying air. This air blower is also applicable to equipment except for the air conditioner 50.

In addition, the use of the electric motor 1 according to the second embodiment as a driving source of the compressor 54 can obtain the same advantages as those described in the second embodiment. Moreover, efficiency of the compressor 54 can be enhanced.

The electric motor 1 described in the second embodiment can be mounted on equipment including a driving source, such as a ventilator, a household electrical appliance, or a machine tool, as well as the air conditioner 50.

Features of the embodiments and features of the variations described above can be combined as appropriate.

What is claimed is:

1. A rotor having 2n (n is a natural number) magnetic poles, comprising:
   at least one first permanent magnet forming part of an outer peripheral surface of the rotor and magnetized to have polar anisotropy; and
   at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and
   the at least one second permanent magnet is a single integral ring-shaped magnet,
   a length of the at least one first permanent magnet in an axial direction of the rotor is longest at a center of the at least one first permanent magnet in the circumferential direction of the rotor, and
   the length of the at least one first permanent magnet in the axial direction of the rotor gradually decreases with being away from the center along the circumferential direction.

2. The rotor according to claim 1, wherein in a plane orthogonal to an axial direction of the rotor, an angle formed by two lines passing through a rotation center of the rotor and both ends of an inner peripheral surface of the at least one first permanent magnet is larger than an angle formed by two lines passing through the rotation center of the rotor and both ends of the outer peripheral surface of the at least one first permanent magnet.

3. The rotor according to claim 1, wherein the at least one first permanent magnet includes a ring-shaped portion covering an end portion of the second permanent magnet in an axial direction of the rotor.

4. The rotor according to claim 1, further comprising a resin covering an end portion of the at least one first permanent magnet in an axial direction of the rotor.

5. The rotor according to claim 1, wherein a width of the first permanent magnet in the circumferential direction is largest at a center of the rotor in an axial direction of the rotor.

6. The rotor according to claim 1, wherein the at least one first permanent magnet is a rare earth magnet.

7. The rotor according to claim 1, wherein the second permanent magnet is a ferrite magnet.

8. An electric motor comprising:
   a stator; and the rotor according to claim 1 rotatably disposed inside the stator.

9. An air blower comprising:
the electric motor according to claim 8; and
a blade to be driven by the electric motor.

10. An air conditioner comprising:
an indoor unit; and
an outdoor unit connected to the indoor unit, wherein
at least one of the indoor unit or the outdoor unit includes the electric motor according to claim 8.

11. A rotor having 2n (n is a natural number) magnetic poles, comprising:
at least one first permanent magnet forming part of an outer peripheral surface of the rotor and magnetized to have polar anisotropy; and
at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and
the at least one second permanent magnet is a single integral ring-shaped magnet,
the at least one first permanent magnet comprises two first permanent magnets, and
in a plane orthogonal to an axial direction of the rotor, an angle formed by two lines passing through adjacent ends of inner peripheral surfaces of the two first permanent magnets is smaller than an angle formed by two lines passing through both ends of the outer peripheral surface of the second permanent magnet between the two first permanent magnets, the adjacent ends being adjacent to each other in the circumferential direction.

12. A rotor having 2n (n is a natural number) magnetic poles, comprising:
at least one first permanent magnet forming part of an outer peripheral surface of the rotor and magnetized to have polar anisotropy;
at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy;
at least one third permanent magnet forming part of the outer peripheral surface of the rotor and magnetized to have polar anisotropy; and
at least one fourth permanent magnet that is a different type from the at least one third permanent magnet, is adjacent to the at least one third permanent magnet in the circumferential direction, has lower magnetic force than magnetic force of the at least one third permanent magnet, and is magnetized to have polar anisotropy, wherein
the at least one second permanent magnet is a single integral ring-shaped magnet,
the at least one first permanent magnet includes a first ring-shaped portion covering an end portion of the second permanent magnet in an axial direction of the rotor,
the at least one third permanent magnet includes a second ring-shaped portion covering an end portion of the fourth permanent magnet in the axial direction of the rotor, and in the axial direction of the rotor, the first ring-shaped portion faces the second ring-shaped portion.

13. The rotor according to claim 12, wherein in a plane orthogonal to the axial direction of the rotor, a magnetic pole center position of the at least one first permanent magnet coincides with a magnetic pole center position of the at least one third permanent magnet.

14. A rotor having 2n (n is a natural number) magnetic poles, comprising:
at least one first permanent magnet forming part of an outer peripheral surface of the rotor and magnetized to have polar anisotropy;
at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy;
at least one third permanent magnet forming part of the outer peripheral surface of the rotor and magnetized to have polar anisotropy; and
at least one fourth permanent magnet that is a different type from the at least one third permanent magnet, is adjacent to the at least one third permanent magnet in the circumferential direction, has lower magnetic force than magnetic force of the at least one third permanent magnet, and is magnetized to have polar anisotropy, wherein
the at least one second permanent magnet is a single integral ring-shaped magnet, and
in a plane orthogonal to an axial direction of the rotor, a magnetic pole center position of the at least one first permanent magnet coincides with a magnetic pole center position of the at least one third permanent magnet.

15. A rotor having 2n (n is a natural number) magnetic poles, comprising:
at least one first permanent magnet forming part of an outer peripheral surface of the rotor and magnetized to have polar anisotropy; and
at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and
the at least one second permanent magnet is a single integral ring-shaped magnet,
both ends of the at least one first permanent magnet in an axial direction overlap each other by an angle w1 [degrees] in a plane orthogonal to the axial direction of the rotor, and
the angle w1 satisfies $0 < w1 < 0.2 \times 2n/360$.

16. A rotor having 2n (n is a natural number) magnetic poles, comprising:
at least one first permanent magnet forming part of an outer peripheral surface of the rotor and magnetized to have polar anisotropy; and
at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and the at least one second permanent magnet is a single integral ring-shaped magnet, in a plane orthogonal to an axial direction of the rotor, both ends of the at least one first permanent magnet in the axial direction overlap each other by an angle w2 [degrees] in an inter-pole part of the rotor, and the angle w2 satisfies $0<w2<0.2\times 2n/360$.

17. A rotor having 2n (n is a natural number) magnetic poles and including a plurality of layered magnets composed of two to m (m is a natural number and a divisor for n) layers that are stacked in an axial direction, wherein each layered magnet of the plurality of layered magnets includes at least one first permanent magnet forming part of an outer peripheral surface of the rotor and magnetized to have polar anisotropy, and at least one second permanent magnet that is a different type from the at least one first permanent magnet, is adjacent to the at least one first permanent magnet in a circumferential direction of the rotor, has lower magnetic force than magnetic force of the at least one first permanent magnet, and is magnetized to have polar anisotropy, and in each first permanent magnet of the plurality of layered magnets, supposing one cycle is an angle formed by adjacent north poles in a plane orthogonal to the axial direction of the rotor, positions of north poles of two first permanent magnets adjacent to each other in the axial direction are shifted from each other by n/m cycles in the circumferential direction, and the at least one second permanent magnet is a single integral ring-shaped magnet.

18. A method for fabricating a rotor including a first permanent magnet and a second permanent magnet, the second permanent magnet being adjacent to the first permanent magnet in a circumferential direction and having lower magnetic force than magnetic force of the first permanent magnet, the method comprising:

generating a magnetic field having polar anisotropy inside a mold for the second permanent magnet, by using a magnet for magnetization;

molding the second permanent magnet magnetized to have polar anisotropy into a single integral ring-shaped magnet, by injection molding;

generating a magnetic field having polar anisotropy inside a mold for the first permanent magnet, by using a magnet for magnetization; and molding the first permanent magnet by injection molding on an outer peripheral surface of the second permanent magnet so that the first permanent magnet forms part of an outer peripheral surface of the rotor, in a state where the second permanent magnet is disposed inside the mold for the first permanent magnet.

* * * * *